US012567972B2

(12) United States Patent
Barnes et al.

(10) Patent No.: US 12,567,972 B2
(45) Date of Patent: Mar. 3, 2026

(54) MESSAGING LAYER SECURITY (MLS) PROTOCOL-BASED SECURE CHANNELS

(71) Applicant: Cisco Technology, Inc., San Jose, CA (US)

(72) Inventors: Richard Lee Barnes, Arlington, VA (US); Karthikeyan Bhargavan, Paris (FR); Franziskus Kiefer, Berlin (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 8 days.

(21) Appl. No.: 18/797,676

(22) Filed: Aug. 8, 2024

(65) Prior Publication Data

US 2025/0240170 A1     Jul. 24, 2025

Related U.S. Application Data

(60) Provisional application No. 63/624,357, filed on Jan. 24, 2024.

(51) Int. Cl.
*H04L 9/32* (2006.01)
(52) U.S. Cl.
CPC ................................. *H04L 9/3242* (2013.01)
(58) Field of Classification Search
CPC .... H04L 9/3242; H04L 9/0891; H04L 9/3247
See application file for complete search history.

(56) References Cited

U.S. PATENT DOCUMENTS

| | | | | |
|---|---|---|---|---|
| 7,430,295 B1 * | 9/2008 | Pearson | ................. | H04B 10/70 |
| | | | | 380/278 |
| 10,412,063 B1 * | 9/2019 | Mandich | ............... | H04L 9/0869 |
| 11,818,268 B2 * | 11/2023 | Vermeulen | ............ | H04L 9/3213 |
| 2003/0177358 A1 * | 9/2003 | Martin | .................. | H04L 63/166 |
| | | | | 713/171 |
| 2015/0095648 A1 * | 4/2015 | Nix | ........................ | H04L 63/166 |
| | | | | 713/170 |
| 2017/0201382 A1 * | 7/2017 | Lindteigen | .......... | H04L 63/0823 |
| 2017/0338951 A1 * | 11/2017 | Fu | ......................... | H04L 9/0894 |
| 2019/0097793 A1 * | 3/2019 | Nix | ..................... | H04L 63/0807 |

(Continued)

FOREIGN PATENT DOCUMENTS

WO     2022162390 A1     8/2022

OTHER PUBLICATIONS

Alia, O., et al., "100 Gbps Quantum-safe IPsec VPN Tunnels over 46 km Deployed Fiber," https://arxiv.org/abs/2405.04415, May 7, 2024, 7 pages.

(Continued)

*Primary Examiner* — J. Brant Murphy

(74) *Attorney, Agent, or Firm* — Edell, Shapiro & Finnan, LLC

(57)     ABSTRACT

Presented herein is a Message Layer Security (MLS)-based secure channel communication arrangement that involves a minimal set of changes to the MLS standard to reduce the redundant overhead in case of two-party (one-to-one or 1:1) communication. These techniques reduce the communication and computation complexity of both devices involved in establishing and supporting the one-to-one secure channel communication. Methods are provided to establish a one-to-one secure channel between a first endpoint and a second endpoint by performing a one-to-one secure channel handshake.

26 Claims, 14 Drawing Sheets

(56) References Cited

U.S. PATENT DOCUMENTS

| | | | | |
|---|---|---|---|---|
| 2019/0097794 | A1* | 3/2019 | Nix | G06F 21/33 |
| 2019/0372764 | A1* | 12/2019 | Fay | H04L 9/0844 |
| 2019/0394029 | A1* | 12/2019 | Vermeulen | H04L 63/061 |
| 2022/0038269 | A1* | 2/2022 | Nix | H04L 9/3093 |
| 2022/0103369 | A1* | 3/2022 | Adams | H04L 9/3234 |
| 2022/0377084 | A1* | 11/2022 | Zhang | H04L 9/0841 |
| 2022/0407688 | A1* | 12/2022 | Childe | H04B 10/118 |
| 2023/0308424 | A1* | 9/2023 | Nix | H04L 9/3242 |
| 2023/0318817 | A1* | 10/2023 | Sattler | H04L 9/0819 |
| | | | | 713/171 |
| 2024/0106636 | A1* | 3/2024 | Nix | H04L 9/0852 |

OTHER PUBLICATIONS

Alwen, J., et al., "Modular Design of Secure Group Messaging Protocols and the Security of MLS," ACM CCS 2021, https://eprint.iacr.org/2021/1083.pdf, Aug. 23, 2021, 107 pages.

Barnes, R., et al., "RFC 9180 Hybrid Public Key Encryption," Internet Research Task Force (IRTF), Feb. 2022, 107 pages.

Barnes, R., et al., "RFC 9420 The Messaging Layer Security (MLS) Protocol," Internet Engineering Task Force (IETF), Standards Track, Jul. 2023, 132 pages.

Beurdouche, B., et al., "The Messaging Layer Security (MLS) Architecture," Network Working Group, draft-ietf-mls-architecture-13, Mar. 22, 2024, 46 pages.

Cisco, "Configuring Quantum-Safe Encryption Using Postquantum Preshared Keys," https://www.cisco.com/c/en/us/td/docs/routers/ios/config/17-x/sec-vpn/b-security-vpn/m-sec-cfg-quantum-encryption-ppk.pdf, last updated Jan. 11, 2021, 16 pages.

Cohn-Gordon, K., et al., "On Ends-to-Ends Encryption: Asynchronous Group Messaging with Strong Security Guarantees," Cryptology ePrint Archive, Version 2.3, https://eprint.iacr.org/2017/666.pdf, Mar. 2, 2020, 37 pages.

Donenfeld, J., "WireGuard: Next Generation Kernel Network Tunnel," WireGuard, Whitepaper, Draft Revision e2da747, https://www.wireguard.com/papers/wireguard.pdf, Jun. 1, 2020, 20 pages.

Fluhrer, S., et al., "RFC 8784 Mixing Preshared Keys in the Internet Key Exchange Protocol Version 2 (IKEv2) for Post-quantum Security," Internet Engineering Task Force (IETF), Standards Track, Jun. 2020, 16 pages.

Housley, R., et al., "RFC 9257 Guidance for External Pre-Shared Key (PSK) Usage in TLS," Internet Engineering Task Force (IETF), Informational, Jul. 2022, 13 pages.

Iyengar J., et al., "RFC 9000 QUIC: A UDP-Based Multiplexed and Secure Transport," Internet Engineering Task Force (IETF), Standards Track, May 2021, 127 pages.

Kaufman, C., et al., "Internet Key Exchange Protocol Version 2 (IKEv2)," Internet Engineering Task Force (IETF), Request for Comments: 5996, Obsoletes: 4306, 4718, Standards Track, Sep. 2010, 138 pages.

Marlinspike, M., et al., "The Sesame Algorithm: Session Management for Asynchronous Message Encryption," Signal, Revision 2, https://signal.org/docs/specifications/sesame/sesame.pdf, Apr. 14, 2017, 17 pages.

One, G., "Open-Source uProxy Extension Offers 'Social' Private Browsing," Greycoder, https://greycoder.com/open-source-uproxy-extension-offers-social-private-browsing, Sep. 21, 2015, 6 pages.

Perrin, T., et al., "The Double Ratchet Algorithm," https://signal.org/docs/specifications/doubleratchet/, Revision 1, Nov. 20, 2016, 35 pages.

Rescorla, E., et al., "RFC 9147 The Datagram Transport Layer Security (DTLS) Protocol Version 1.3," Internet Engineering Task Force (IETF), Apr. 2022, 61 pages.

Rescorla, E., "HTTP Over TLS," Network Working Group, Request for Comments: 2818, May 2000, 7 pages.

Rescorla, E., "The Transport Layer Security (TLS) Protocol Version 1.3," Internet Engineering Task Force (IETF), Request for Comments: 8446, Aug. 2018, 160 pages.

Thomson, M., et al., "RFC 9001 Using TLS to Secure QUIC," Internet Engineering Task Force (IETF), May 2021, 44 pages.

Tor Project, "All About Tor," torproject.org, last updated on Mar. 29, 2023, 76 pages.

Wallez, T., et al., "TreeSync: Authenticated Group Management for Messaging Layer Security," USENIX Association, https://www.usenix.org/system/files/sec23fall-prepub-372-wallez.pdf, last revised Apr. 18, 2023, 17 pages.

Alwen J., et al., "On the Insider Security of MLS", IACR, International Association for Cryptologic Research, vol. 20220811:145544, XP061075629, https://eprint.iacr.org/archive/2020/1327/1660229744.pdf, Aug. 11, 2022, pp. 1-64.

Wikipedia, "TLS Handshake", OSDev Wiki, XP093262089, https://web.archive.org/web/20240121090205/ http://wiki.osdev.org/TLS_Handshake, Jan. 21, 2024, 10 pages.

International Search Report and Written Opinion for International Application No. PCT/US2025/011962, mailed Apr. 3, 2025, 13 Pages.

* cited by examiner

600

620

OBTAINING A FIRST ENDPOINT KEY PACKAGE    622

GENERATING A WELCOME MESSAGE    624

ENCRYPTING THE WELCOME MESSAGE TO PRODUCE AN ENCRYPTED WELCOME MESSAGE AND TRANSMITTING IT TO THE FIRST ENDPOINT    626

RECEIVING A CONFIRMATION MESSAGE FROM THE SECOND ENDPOINT    628

MESSAGING LAYER SECURITY (MLS) PROTOCOL-BASED SECURE CHANNELS

CROSS REFERENCE TO RELATED APPLICATION

This application claims priority to U.S. Provisional Patent Application No. 63/624,357, filed Jan. 24, 2024, entitled "Messaging Layer Security (MLS) Protocol-Based Secure Channels," the entirety of which is incorporated herein by reference.

TECHNICAL FIELD

The present disclosure relates to secure communications.

BACKGROUND

The Messaging Layer Security Protocol (as defined in Internet Engineering Task Force (IETF) RFC 9420) provides for efficient asynchronous group key establishment with forward secrecy and post-compromise security for groups in size ranging from two to thousands. However, while being designed for and efficient in large groups, it has significant overhead in the one-to-one (1:1) (two-party) case, compared to other two-party secure channel protocols.

DETAILED DESCRIPTION

Overview

Figure 1:
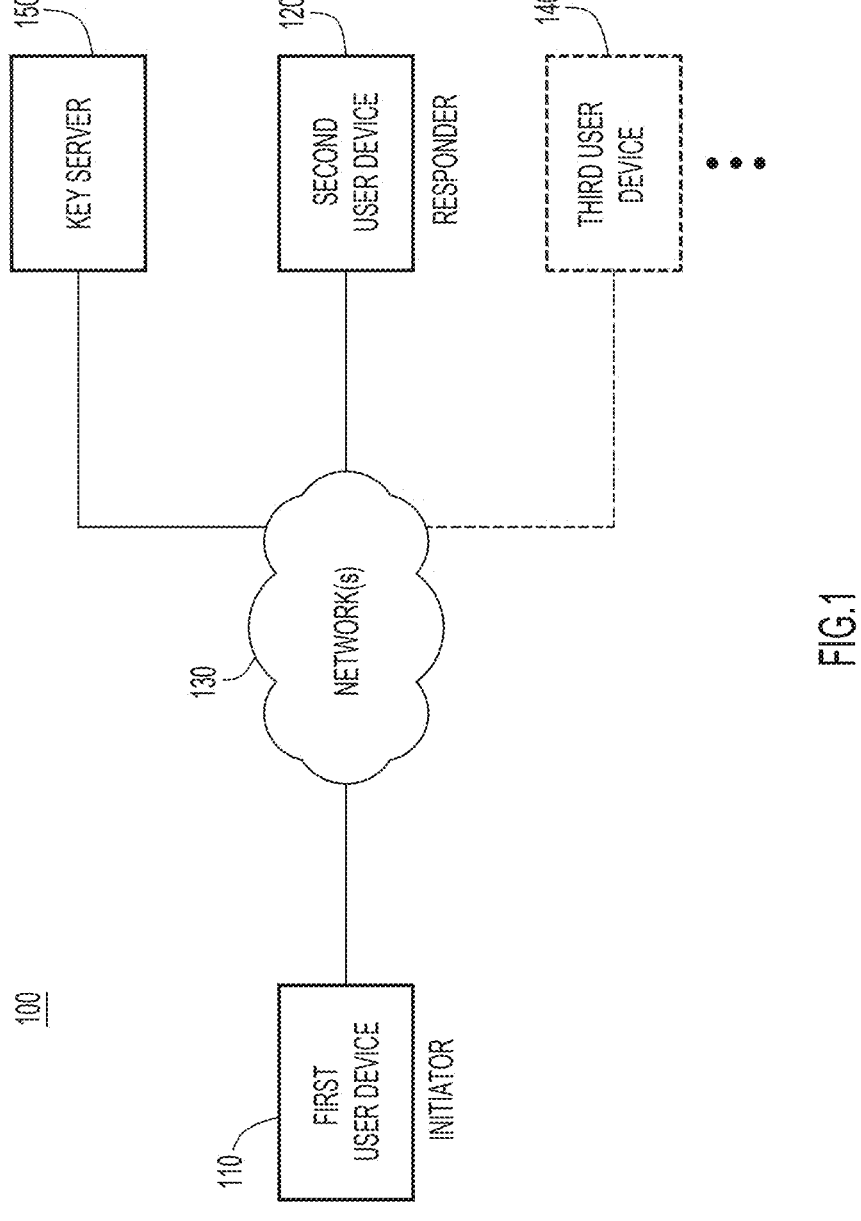
FIG. 1 is block diagram of a system that includes two user devices configured to establish one-to-one secure channel communication, according to an example embodiment.

Presented herein is an MLS-based secure channel communication arrangement that involves a minimal set of changes to the MLS standard to reduce the redundant overhead in case of two-party (one-to-one or 1:1) communication. These techniques reduce the communication and computation complexity of both devices involved in establishing and supporting the one-to-one secure channel communication.

In one example, a method is provided to establish a one-to-one secure channel between a first endpoint and a second endpoint by performing a one-to-one secure channel handshake. The method is performed by the first endpoint and includes receiving from the second endpoint, a welcome message. The welcome message comprises welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript comprises a first endpoint key package and the welcome content; and a signature computed over the welcome content and the welcome tag using a second endpoint signature key. The method further includes verifying the welcome message by: decrypting the welcome message using a first endpoint private decryption key that corresponds to a first endpoint ephemeral public encryption key; verifying the signature of the welcome message using the second endpoint signature verification key; and verifying the welcome tag in the welcome message. Upon verifying the welcome message, the method includes sending to the second endpoint a confirmation message that confirms the one-to-one secure channel.

In another example, a method is provided that is performed by a second endpoint as part of establishing a one-to-one secure channel between a first endpoint and a second endpoint by performing a one-to-one secure channel handshake. The method performed by the second endpoint includes obtaining a first endpoint key package, the first endpoint key package including a first endpoint ephemeral public encryption key and a first endpoint signature verification key corresponding to a first endpoint signature key. The first endpoint key package is signed with the first endpoint signature key. The method further includes generating a welcome message to be sent to the first endpoint. The welcome message comprises welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript comprises the first endpoint key package and the welcome content; and a signature computed over the welcome content and welcome tag using a second endpoint signature key. The method includes encrypting the welcome message using the first endpoint ephemeral public encryption key to produce an encrypted welcome message and transmitting the encrypted welcome message to the first endpoint. Upon the first endpoint decrypting the welcome message, verifying the signature of the welcome message using the second endpoint signature verification key, and verifying the welcome tag by recomputing a message authentication code using the welcome transcript and the welcome key, the method further includes receiving from the first endpoint a confirmation message.

Example Embodiments

User devices connected to the Internet need to establish "secure channels" so that they can communicate safely. A "secure channel" is a virtual connection over one or more networks that provides several security properties:

Confidentiality—Content sent over the channel is only be accessible to the endpoints of the channel.

Authenticity—Each endpoint is able to verify the identity of the other endpoint

Forward Security—If either endpoint refreshes the keys in a session, an attacker that subsequently compromises either endpoint is not be able to access content sent before the refresh.

Post-compromise Security—If either endpoint refreshes the keys in a session, an attacker that compromised either endpoint before the refresh is not be able to access content after the refresh.

Post-quantum security—The above properties continue to hold even in the face of an attacker with a quantum computer.

The MLS group key management protocol of RFC 9420 provides these properties, but has not been previously used to create secure channels.

Techniques are provided for a general cryptographic protocol with a defined relationship to the Message Layer Security (MLS) protocol of RFC 9420, with variants tailored to asynchronous environments on the one hand, and on the other hand, to synchronous, environments.

The techniques involve instantiation of MLS to two participants. MLS has significant overhead compared to other two-party secure channel protocols. A minimal set of changes to the MLS protocol are provided to reduce the communication and computation cost at both devices supporting the two-party communication.

The resulting protocol, referred to herein as "2MLS" or "2-party MLS", is targeted at two-party (one-to-one) secure channel scenarios where protocols like the Transport Layer Security (TLS) protocol or WireGuard® open source technology are currently used. TLS, for example, is designed with two clearly distinct entities, client and server, which is built into the protocol such that the client always has to be the initiator of the transport connection. MLS is symmetric by design, and therefore allows more flexibility in its usage, and provides mutual authentication as a default. Additionally, since MLS is a key encapsulation mechanism (KEM)- and-signature based protocol, 2MLS can immediately make use of post-quantum KEM technologies without needing substantial protocol changes, unlike the TLS protocol or WireGuard technology. WireGuard® is a registered trademark of Jason A. Donenfeld.

2MLS can also be seen as an alternative to asynchronous messaging protocols (using the Extended Triple Diffie-Hellman (X3DH) and Double-Ratchet key management techniques) in a way that allows for an easy upgrade to post-quantum security and to full MLS groups.

In particular, MLS (and consequently 2MLS) supports both post-quantum secrecy (via post-quantum (PQ) KEMs) and post-quantum authentication (via PQ signatures), which Diffie-Hellman (DH)-based protocols like the Signal® protocol and WireGuard do not. Unlike TLS, MLS also supports a symmetric treatment of endpoints, where each endpoint is authenticated by its signature (even if the signature key is associated with a self-signed credential). Finally, MLS supports key updates that offer both forward secrecy and post-compromise security (like Signal, but unlike Wire-Guard and TLS). Signal® is a registered trademark of Signal Technology Foundation.

Unlike MLS, 2MLS is supports synchronous operation between two endpoints, without the need for a delivery service, but it can also be run as an asynchronous messaging protocol.

Session resumption is an important feature in protocols like TLS to reduce handshake latency and open multiple parallel sessions between two endpoints. Protocols like WireGuard and Signal do not support this notion of resumption. However, MLS uses resumption pre-shared keys to re-initialize a session (group), and these pre-shared keys are also used in 2MLS to support session resumption in the sense of TLS.

Supporting multiple devices (endpoints) for the same client is not supported by TLS, WireGuard, or Signal. However, Signal-based applications use mechanisms like sender keys to achieve multi-device support. 2MLS can support multiple devices in similar ways.

2MLS occupies a distinct spot that combines many of the features of TLS 1.3, WireGuard, and Signal while offering improved post-quantum security, symmetric connections, and the unique advantage of being able to smoothly scale to larger groups. With further modifications it is also possible to support resumption to support multiple channels, and multi-device connections.

A core 2MLS handshake is defined herein that provides the comparable security guarantees and performance as TLS 1.3, WireGuard, and the other predecessors discussed above. It assumes the existence of an authentication or public key infrastructure (PKI) that issues and validates credentials for endpoints, and optionally, a server where endpoints can upload and download key packages to speed up connection establishment. Any protocol that uses the transport keys generated by 2MLS may be used to encrypt application data. In particular, the 2MLS handshake protocol could be used with the Transmission Control Protocol (TCP), the QUIC, the User Datagram Protocol (UDP) or with an application-specific protocol.

Reference is now made to FIG. 1. FIG. 1 illustrates a block diagram of a system 100 that includes a first user device 110 and a second user device 120 that are capable of communicating over one or more networks 130. The one or more networks 130 may include any combination of wireless or wired local area networks and wireless or wired wide area networks (e.g., the Internet).

The first user device 110 and the second user device 120 are configured to support a one-to-one communication employing a one-to-one secure channel handshake and other techniques presented herein, according to an example embodiment. The first user device 110 may also be referred to as a first endpoint and the second user device 120 may be referred to as a second endpoint. The first user device (endpoint) 110 may be a 2MLS Initiator (or simply "Initiator") and the second user device (endpoint) 120 may be a 2MLS Responder (or simply "Responder"). The first user device 110 and the second user device 120 may be configured to add to their secure channel, once established, one or more other user devices (endpoints), as indicated by the third user device 140, and so on. In some implementations, a PKI key server 150 may be involved, where the Responder obtains a key package for the Initiator by downloading it from the key server 150, instead of the Initiator sending it to the Responder.

Figure 12:
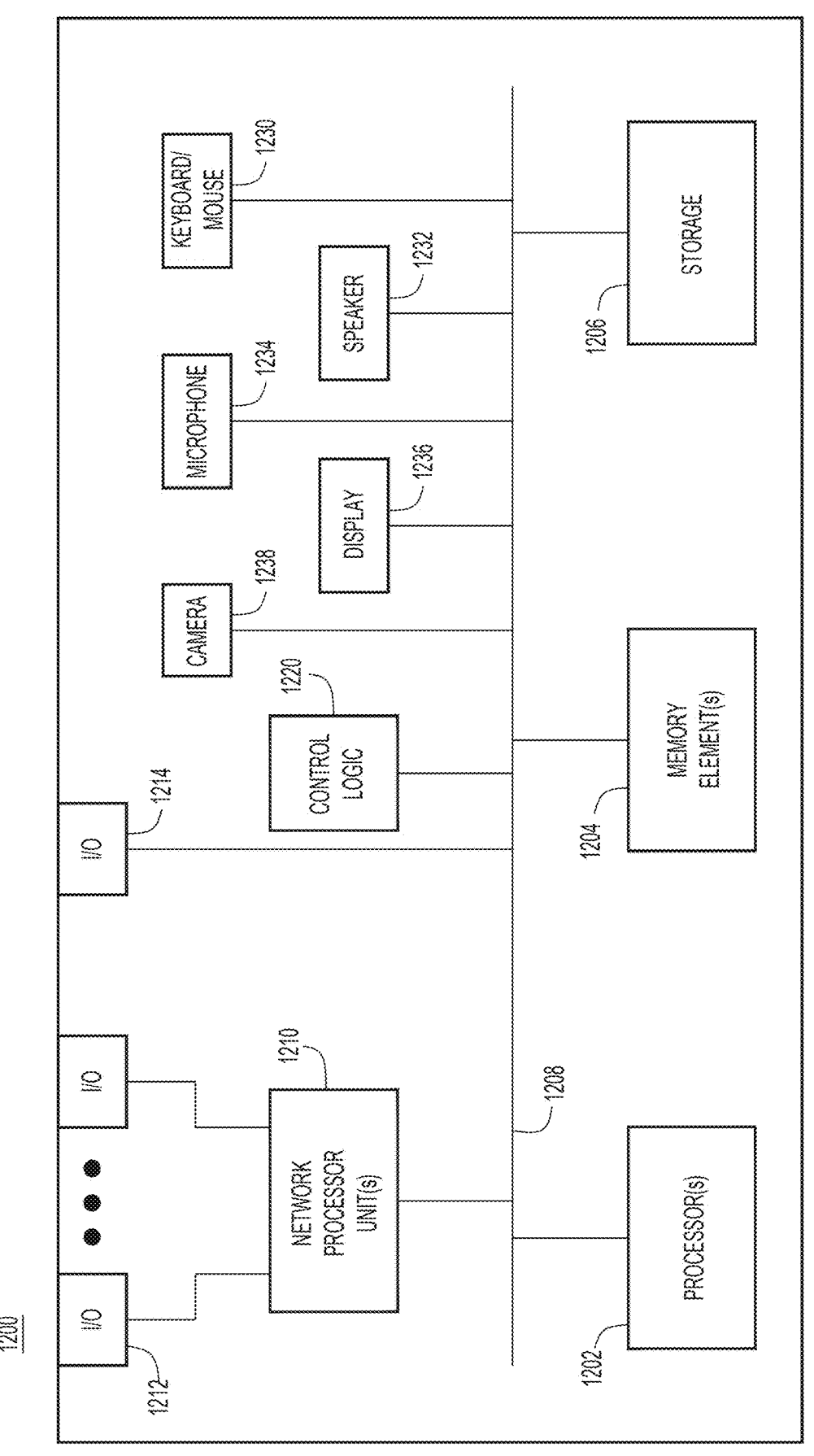
FIG. 12 is a block diagram of a device that may be configured to operate as either an Initiator or Responder in connection with the one-to-one secure channel communication techniques, according to an example embodiment.

The user devices (endpoints) shown in FIG. 1 and referred to herein may be stand-alone devices, such as desktop computers, laptop computers, mobile phones, tablet computers, or any other suitable device now known or hereinafter developed that enables communication between or among two or more parties, etc. An example high-level block diagram of a suitable user device is shown in FIG. 12, described below. In addition, the user devices (endpoints) may be entirely virtualized in the cloud through any virtualization technology now known or hereinafter developed.

Terminology

Some terminology used herein is similar to the terminology used in RFC 9420 for the Messaging Layer Security (MLS) Protocol, but again, directed to establishing a secure channel between two parties.

Client (Also Referred to as Endpoint and Party):

An agent that uses this protocol to establish shared cryptographic state with other clients. A client is defined by the cryptographic keys it holds.

Group:

A group represents a logical collection of clients that share a common secret value at any given time. The state of the group is represented as a linear sequence of epochs in which each epoch depends on its predecessor. A 2MLS group has only 2 clients, but a 2MLS group can be converted to a MLS group, as described herein.

Epoch:

A state of a group in which a specific set of authenticated clients hold a shared cryptographic state. Thus, as in the MLS protocol, the history of a group is divided into a linear sequence of epochs. In each epoch, a set of authenticated members agree on an epoch secret that is known only to the members of the group in that epoch.

Member:

A client that is included in the shared cryptographic state of a group and hence has access to the group's secrets.

Key Package (KeyPackage):

A signed object describing a client's identity and capabilities, including a hybrid public key encryption ((HPKE) of Internet Engineering Task Force (IETF) RFC 9180) public key that can be used to encrypt to that client. Other clients can use a client's KeyPackage to introduce the client to a new group.

Signature Key:

A signing key pair used to authenticate the sender of a message.

PublicMessage:

A message that is signed by its sender and authenticated as coming from a member of the group in a particular epoch, but not encrypted.

PrivateMessage:

A message that is signed by its sender, authenticated as coming from a member of the group in a particular epoch, and encrypted so that it is confidential to the members of the group in that epoch.

Key Derivation Function (KDF): A cryptographic algorithm that derives one or more secret keys from a secret value using a pseudorandom function, such as a cryptographic hash function or block cipher. KDFs can stretch keys into longer keys of a desired format.

Application Message:

A PrivateMessage carrying application data.

In general, symmetric values are referred to as "keys" or "secrets" interchangeably. Either term denotes a value that is to be kept confidential to a client. When labeling individual values, the term "secret" refers to a value that is used to derive further secret values and "key" to refer to a value that is used with an algorithm such as Hashed Message Authentication Code (HMAC) or an Authenticated Encryption with Associated Data (AEAD) algorithm.

Figure 2C:
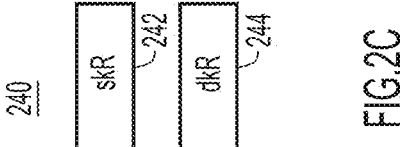
FIGS. 2A, 2B and 2C illustrate cryptographic material related to states of an Initiator and a Responder, which are used in the course of the to-one secure channel communication techniques presented herein, according to an example embodiment.
Figure 2B:
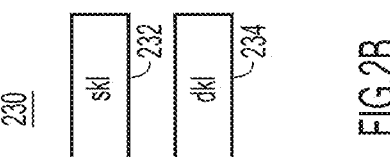
Figure 2A:
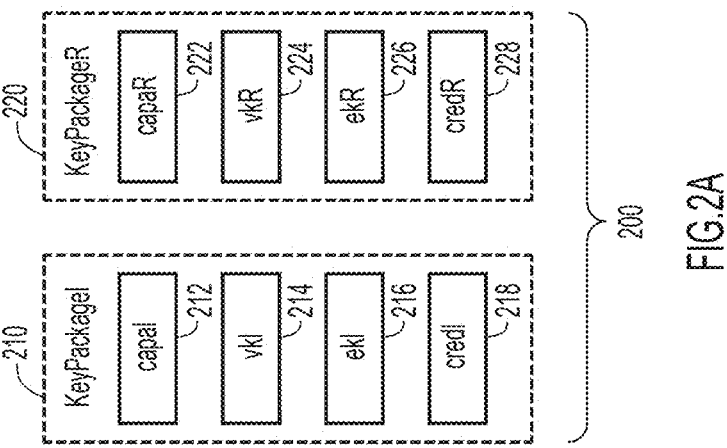

FIGS. 2A, 2B and 2C illustrate cryptographic material related to states of an Initiator and a Responder, which are used in the course of the techniques presented herein.

FIG. 2A shows information related to the shared public/published state 200 of each of an Initiator (I) and a Responder (R). The shared public state are included in a key package for each of the Initiator and Responder. The Initiator key package denoted KeyPackageI 210 includes information (contained in designated fields) indicating Initiator capabilities denoted capaI 212, an Initiator signature verification key denoted vkI 214, an Initiator encryption key denoted ekI 216 (also referred to herein as the Initiator's ephemeral public encryption key), and an Initiator credential denoted credI 218. Similarly, the Responder key package denoted KeyPackageR 220 includes information indicating Responder capabilities denoted capaR 222, a Responder signature verification key denoted vkR 224, a Responder encryption key denoted ekR 226 (also referred to herein as the Responder's ephemeral public encryption key), and a Responder credential denoted credR 228.

A 2MLS endpoint can generate a key package for itself at any time. The credential that is part of the key package may be obtained by a party from an authentication service. The authentication service is configured to issue a credential to those parties that authenticate their identity to the authentication service.

FIG. 2B shows the Initiator secret state 230. The Initiator secret state 230 includes an Initiator signature key denoted skI 232 and an Initiator decryption key dkI 234. Similarly, FIG. 2C illustrates the Responder secret state 240. The Responder secret state 240 includes a Responder signature encryption key denoted skR 242 and a Responder decryption key dkR 244. All of the keys shown in FIGS. 2A, 2B and 2C are asymmetric keys.

Thus, the Initiator has a public encryption key and an associated or counterpart private decryption key that it can use to decrypt content that has been encrypted by another party (e.g., the Responder) with the Initiator's public encryption key. Similarly, the Responder has a public encryption key and an associated or counterpart private key that it can use to decrypt content that has been encrypted by another party (e.g., the Initiator) with the Responder's public encryption key. Generally, one computation/operation is used to generate the public encryption key and the associated private decryption key (encryption/decryption key pair), such as that described in IETF RFC 7748, which describes how to generate a key pair using elliptic curve cryptographic techniques, and IETF RFC 9180 HPKE describes how those keys are used to do encryption.

In an analogous manner, the Initiator and Responder use an algorithm, such as that presented in IETF RFC 8032, to generate the signature (signing key) and signature verification (verifying key) key pair. Each party includes the signature verification key in its key package that it shares with another party, but maintains the signature key secret. So only one party can sign content with the signature key, but any party with the signature verification key can verify the signature on signed content, indicating that only that authorized/authentic party provided the signed content. Thus, signature (signing) keys and decryption keys are private/secret keys, whereas encryption keys and signature verification keys are public keys.

The Initiator generates a fresh key package to provide to the Responder. Cipher suites, other than the one indicated in a CipherSuite field of the key package, that the Initiator supports, are listed in the field for capaI 212. A cipher suite is a set of cryptographic algorithms used to create keys and encrypt information. Cipher suites may be used to negotiate security settings during the a handshake. For example, a cipher suite may specify an algorithm for each of (a) key exchange algorithm, (b) bulk encryption algorithm, and (c) message authentication code (MAC) algorithm. When providing the Initiator KeyPackage, the signature key needs to be present, but the credential may be omitted if the sender wishes to be anonymous at this stage of the protocol.

Thus, the key package defines the proposed session parameters, including a version and cipher suite, an ephemeral key encapsulation mechanism (KEM) public key encryption key, credential, signature key, a signature, and a private key corresponding to the signature key over the key package.

The One-to-One Secure Channel Handshake

Figure 3A:
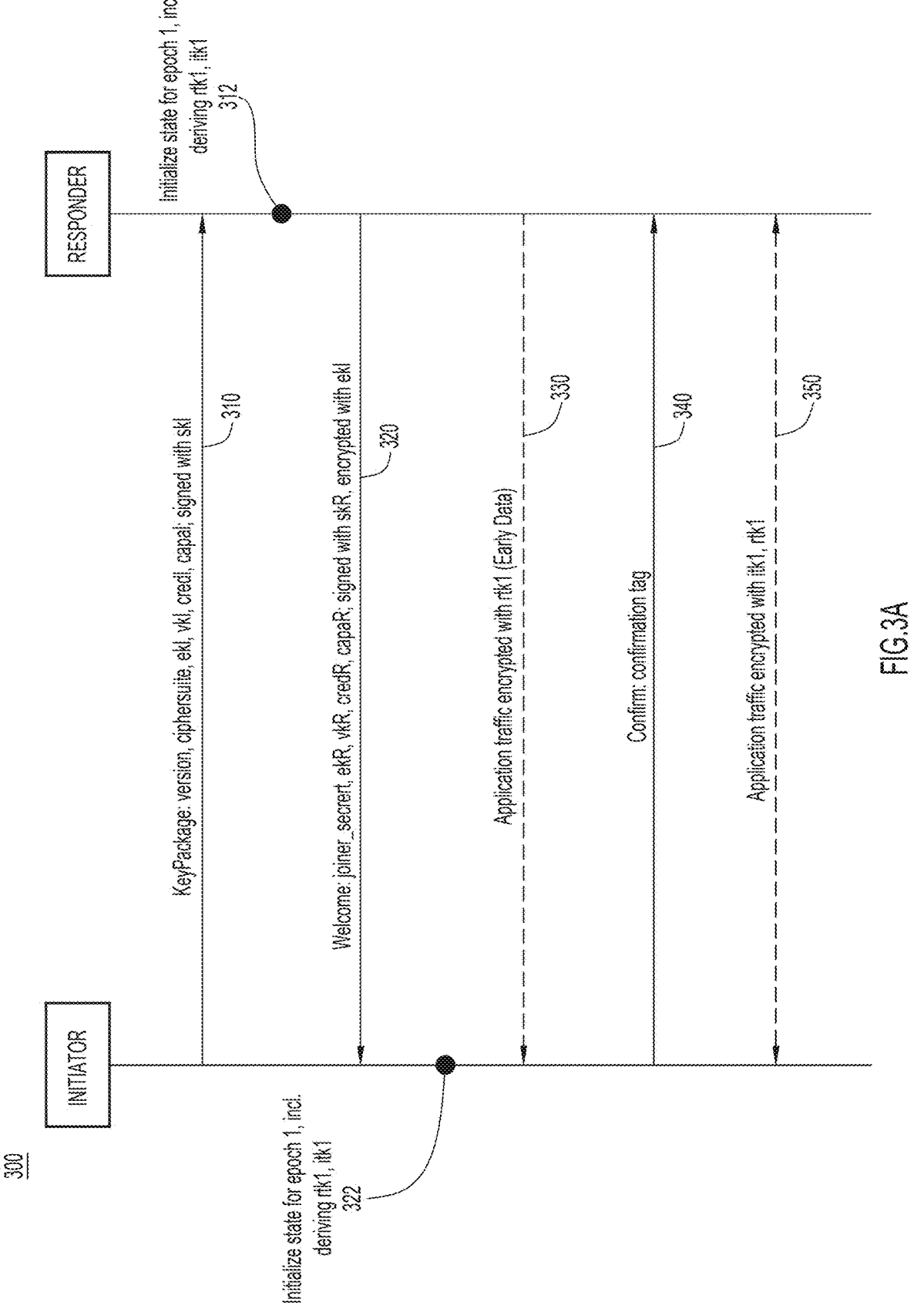
FIG. 3A is a sequence diagram depicting a one-to-one secure channel handshake to establish secure channel communication between two user devices, according to an example embodiment.

Reference is now made to FIG. 3A. FIG. 3A is a sequence diagram for a one-to-one secure channel handshake 300, according to an example embodiment.

The one-to-one secure channel (2MLS) handshake 300 generally operates as follows. A Responder obtains the Initiator key package (KeyPackageI) either by downloading it from a key server, e.g., key server 150 shown in FIG. 1, or by the Initiator sending it to the Responder. In either case, the Responder can accept the connection with the Initiator and send a Welcome message to the Initiator. At this point, the Responder can start sending encrypted message to the Initiator (referred to as Early Data). After verifying the Welcome message, the Initiator sends a Confirm message to the Responder. After that, the two parties may freely exchange encrypted messages (in both directions).

The one-to-one secure channel (2MLS) handshake 300 is now described in more detail. As shown at step 310, the Initiator sends to the Responder a KeyPackage message containing the Initiator's key package, referred to above as KeyPackageI in FIG. 2A. Alternatively, the Responder downloads the Initiator's key package from a key server. In any case, the Initiator's key package includes: version information and cipher suite, an ephemeral KEM public key encryption key (ekI), the Initiator's credential (credI), the Initiator's verification key (vkI), and the Initiator's capabilities (capaI), all of which are signed with the Initiator's secret/private signature key (skI). That is, the Initiator generates a signature using its signature key over the entire contents of the Initiator key package.

An example of the structure of a key package is shown below.

```
struct {
    HPKEPublickey encryption_key;
    optional<SignaturePublicKey> signature_key;
    optional<Credential> credential;
    Extension extensions<V>; Capabilities
        capabilities;
} 2KeyPackage;
struct {
    ProtocolVersion version = 2mls10;
    CipherSuite cipher_suite; 2KeyPackage
        key_package;
} 2MlsKeyPackageTBS;
struct {
    2MlsKeyPackageTBS key_package_tbs;
    /* SignWithLabel(signing_key, "2MlsKeyPackage",
        key_package_tbs) */ opaque signature<V>;
} 2MlsKeyPackage;
```

The initial state for the handshake is denoted epoch 0, where the epoch is indicated by parenthetical with respect to the secret state. For example, the secret state at epoch 0 is "secret(0)" and the secret state at epoch 1 is "secret(1)" and so on. Once the Responder receives/obtains the Initiator's key package, as shown at step 312, the Responder initializes state for epoch 1 and derives a responder traffic key for epoch one, called rtk1. If the Responder agrees with the parameters of the Initiator's key package, at step 320 the Responder creates and sends to the Initiator a Welcome message. If the Responder does not support the provided parameters, the Responder may respond with a retry message containing the Responder's key package, as described below.

The Welcome message includes a joiner_secret, Responder's ephemeral public encryption key (ekR), Responder's verification key (vkR), Responder's credential (credR), Responder's capabilities (capaR), all of which are signed with the Responder's signature key (skR) and encrypted with the Initiator's public ephemeral encryption key (ekI). Thus, the Welcome message includes a joiner_secret, a session identifier (session_id) and the Responder's key package (containing the Responder's encryption key, Responder's signature verification key) but the Responder's credential is optional. The session_id, which corresponds to the group identifier in RFC9420, and the joiner_secret may be chosen at random with length of the digest in the cipher suite.

The Welcome message also contains a message authentication code (MAC) computed using a welcome_confirmation_key, derived from the exporter_secret, over the transcript so far, i.e., the KeyPackage and WelcomeTBM. Finally, the Welcome message contains a signature using the Responder's signature key, and all the above are encrypted using hybrid public key encryption (HPKE) under the Initiator's encryption_key.

The transcript hashes used in 2MLS are different from those in MLS. 2MLS includes the full contents of the KeyPackage and Welcome in the transcript hashes, whereas MLS only includes parts of their contents. This hash over the full contents can be performed in 2MLS since there are only two parties and so all parties can agree on these contents.

```
key_package_transcript_hash = Hash(2MlsKeyPackage)
welcome_transcript_hash_tbm = Hash(2MlsKeyPackage ||
    2MlsWelcomeTBM)
```

In particular, the welcome_transcript_hash_tbm includes all the session parameters, key material, and credentials exchanged so far in the protocol and hence contains all the elements included in the MLS GroupContext.

Once the Welcome message is sent, epoch 1 is entered. To derive the keys for this epoch, the MLS Key Schedule is run, using the joiner_secret, and using the welcome_transcript_hash_tbm in place of the GroupContext. The exporter_secret is then derived and used to derive all other keys, including the welcome_key.

```
welcome_key = DeriveSecret(exporter_secret, "2MlsWelcomeTag")
welcome_tag = Mac(welcome_key, welcome_transcript_hash_tbm)
```

The welcome_tag is an additional MAC used in 2MLS which does not appear in MLS. It serves to bind the derived keys to the complete transcript so far, providing strong agreement between the two parties on all protocol parameters.

An example of the structure of the Welcome message is provided below.

```
struct {
    opaque joiner_secret<V>; opaque
    session_id<V>; uint32 epoch =
    0; 2KeyPackage key_package;
} 2MlsWelcomeTBM;
struct {
    2MlsWelcomeTBM welcome_tbm;
    /* MAC(welcome_key, welcome_transcript_hash_tbm) */ Mac
    welcome_tag;
} 2MlsWelcomeTBS;
struct {
    2MlsWelcomeTBS welcome_tbs;
    /* SignWithLabel(signing_key, "2MlsWelcome", welcome_tbs) */
    opaque signature<V>
} 2MlsWelcomeTBE;
struct {
    optional<KeyPackageRef> key_package_ref;
    /* EncryptWithLabel(peer_encryption_key, "2MlsWelcome",
key_package_transcript_hash, 2MlsWelcomeTBE) */
    HPKECiphertext encrypted_welcome;
} 2MlsWelcome;
```

In the above, the notation "TBE" means "to be encrypted," the notation "tbm" means to be MAC'd (message authentication code computed), and "tbs" means "to be signed."

Thus, to summarize, the Welcome message comprises: welcome content including a joiner secret (that the Responder generates using the key schedule, described below in connection with FIG. 3B), a session identifier, a Responder ephemeral public encryption key and a Responder signature verification key (in which the Responder ephemeral public encryption key and the Responder signature verification key are part of the Responder's key package); a welcome tag that is a message authentication code computer over a welcome transcript using a welcome key derived from the joiner secret, wherein the welcome transcript comprises the Initiator key package and the welcome content; and a signature computed over the welcome content and the welcome tag using the Responder signature key.

After the Initiator receives the Welcome message, at step 322, the Initiator can initialize the state for epoch 1, including deriving the responder traffic key, rtk1 to decrypt traffic that the Responder may send to the Initiator. That is, after sending the Welcome message, at step 330 the Responder can send so called Early Data, encrypted under the responder traffic key, rtk1, corresponding to the early_data_secret derived from the exporter_secret. Step 330 is entirely optional to the Responder.

The Initiator verifies the Welcome message by decrypting the (encrypted) Welcome message using the Initiator's private decryption key that corresponds to the Initiator's ephemeral public encryption key, verifying the signature of the Welcome message using the Responder's signature verification key, and then verifying the welcome tag in the Welcome message. The Initiator verifies the welcome tag by recomputing a welcome transcript to produce a recomputed welcome transcript and generating a derived welcome key from the recomputed welcome transcript. Then, the Initiator recomputes a message authentication code using the recomputed welcome transcript and the derived welcome key to produce a recomputed message authentication code. Next, the Initiator compares the recomputed message authentication code with the message authentication code of the welcome message; if they match, then the welcome tag (and thus the Welcome message) is verified.

At step 340, after the Initiator verifies the Welcome message that it receives from the Responder, the Initiator sends a confirmation message. The confirmation (confirm) message includes a confirmation tag that is based on a message authentication code (MAC) that is computed based on a confirmation key that is derived from the exporter secret over the transcript hash.

```
welcome_transcript_hash = Hash(2MlsKeyPackage || 2MlsWelcome)
confirmation_key = DeriveSecret(exporter_secret, "2MlsConfirm")
confirmation_tag = Mac(confirmation_key, welcome_transcript_hash)
```

The confirmation message is a new message in the 2MLS handshake that does not exist in RFC 9420. An example of the structure of the confirmation message is:

```
struct {
    /* MAC(confirmation_key, welcome_transcript_hash) */ Mac
    confirmation_tag;
} 2MlsConfirm;
```

Said another way, the Initiator generates the confirmation tag based on a MAC operation performed over a confirmation key and a hash of the welcome transcript. The confirmation key is derived from the exporter secret which is derived according to the key schedule described below in connection with FIG. 3B.

After the Initiator sends the confirmation message, the Initiator derives new transport keys for epoch 1 from the exporter secret and the full transcript hash. At this point, the Initiator can start sending encrypted application data and once the Responder receives the confirmation message, the Responder stops sending Early Data and sends application traffic using rkt1 to the Initiator at step 350:

```
confirm_transcript_hash = Hash(2MlsKeyPackage ||
    2MlsWelcome ||
    2MlsConfirm)
```

Thus, at step 350, the Initiator and the Responder can send encrypted traffic to each other.

When the Initiator's identity should not be sent in public, the initial key package may contain an empty credential. The Initiator can then send an Update message immediately after the Confirm message to provide its credential and authenticate the key exchange.

To summarize, the 2MLS handshake depicted in FIG. 3A, unlike MLS, employs a more comprehensive transcript in that the Initiator's key package and the Welcome message get included in the transcript that gets folded in the generation of the various keys by the Initiator and Responder to send encrypted traffic to each other. This stronger binding of security material between the Initiator and Responder can be achieved because there are only two parties involved. That is, the party that obtained the key package (the Responder) and the party that received the welcome message (the Initiator) can agree/confirm that they sent and received the same messages (by computing values from the transcript of those messages that are the same).

The "welcome content" included in the "Welcome message" sent from the Responder to the Initiator at 320 consists of the joiner secret, session ID and Responder key package. The "welcome transcript" comprises (a) the Initiator's key package and (b) the welcome content. The Welcome message comprises: the welcome content, a "welcome tag" that is a MAC over the welcome transcript using a "welcome key" derived from the joiner secret, a signature over the welcome content and the welcome tag by the Responder's private signature key, all of the above encrypted with the Initiator's public encryption key to produce an encrypted Welcome message.

The Initiator verifies the Welcome message by: decrypting the encrypted welcome message using the Initiator's private decryption key (corresponding to the Initiator's public encryption key), verifying the signature using the Responder's public signature verification key (corresponding to the Responder's private signature key), computing the welcome transcript and deriving the welcome key, and verifying the welcome tag by recomputing the MAC using the welcome transcript and welcome key. If the recomputed MAC matches the MAC contained in the Welcome message, then the Welcome message is said to be verified.

PSK-Based Resumption

2MLS also allows pre-shared key (PSK)-based resumption for sessions. A resumption handshake may be performed by modifying the full handshake of FIG. 3A, by adding a pre-shared key (PSK) and making signatures optional.

The Initiator can indicate support for PSK-based handshake by adding a psk_id in the capabilities field of its key package. In this case, the Responder encrypts the Welcome message using HPKE in AuthPSK mode with a key derived from the PSK. The two parties then use both the PSK and the joiner_secret in the key schedule to derive the exporter_secret.

Thus, in summary, the modifications to the 2MLS handshake messages and sessions keys when a PSK is used are:

KeyPackage: The Initiator sends or uploads a psk_id along with the ephemeral encryption key pkM, and a MAC using the psk on the KeyPackage. The Initiator's credential and signature are optional.

Welcome: The usual Welcome except that the epoch secret is derived from both the joint secret and the psk, and the Responder's credential and signature are optional.

Confirm: No change except that implied by the change to the epoch secret above.

UpdateCommit, UpdateConfirm: No change

EarlyData, AppData: No change

The rest of the flow remains the same.

Key Schedule-Transport Encryption Key Handling

Figure 3B:
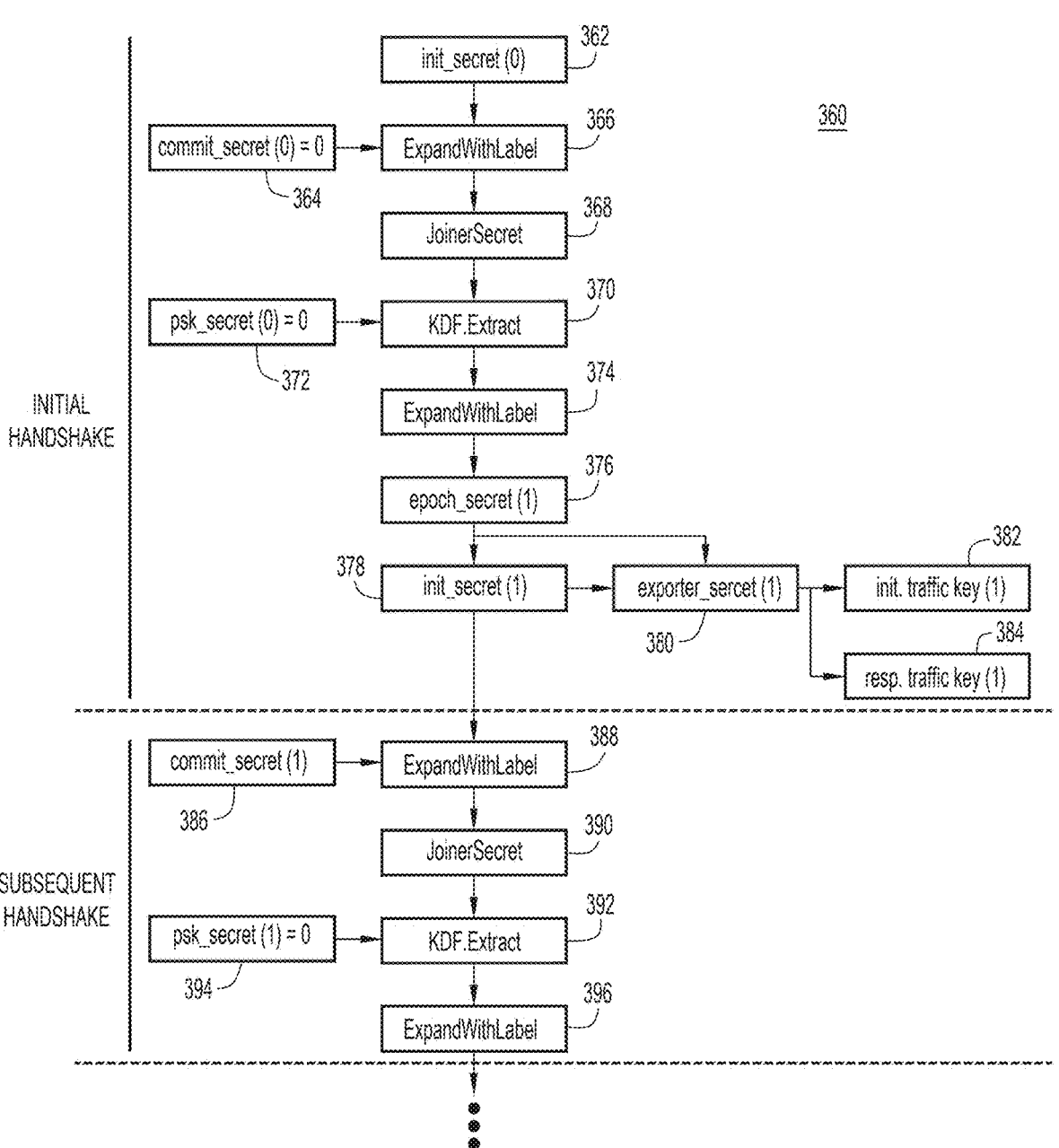
FIG. 3B is a diagram depicting a key schedule of shared secrete state between two parties for the one-to-one secure channel communications, according to an example embodiment.

FIG. 3B is a diagram depicting a key schedule 360 of shared secrete state. All values of the shared secret state in the key schedule 360 are symmetric secrets. There are shared secrets states involved in an initial handshake exchange and shared secret states involved in a subsequent handshake exchange, as described further below. Keys are derived using Extract and Expand functions from the Key Derivation Function (KDF), as well as the functions defined below.

```
ExpandWithLabel(Secret, Label, Context, Length) = KDF.Expand(Secret,
KDFLabel, Length)
DeriveSecret(Secret, Label) = ExpandWithLabel(Secret, Label, "",
KDF.Nh)
```

A KDFLabel is defined as:

```
struct {
    uint16 length;
    opaque label<V>;
    opaque context<V>;
} KDFLabel ;
```

The value KDF.Nh is the size of an output from KDF.Extract, in bytes. In FIG. 3B, KDF.Extract takes its salt argument from the top and its Input Keying Material (IKM) argument from the left, and 0 represents an all-zero byte string of length KDF.Nh.

When processing a handshake message, an endpoint combines the following information to derive new epoch secrets:

The initial (init) secret (init_secret) 362; and

The commit secret (commit_secret) 364 for the current epoch. The commit_secret 364 is initially zero for epoch 0.

Given these inputs, the derivation of secrets for an epoch proceeds as shown in FIG. 3B, where a KDF Expandwith-Label function 366 is performed based on the init secret 362 and commit secret 364 to produce the joiner secret (Joiner-Secret) 368.

At 370, using an injected pre-shared key (psk_secret) during the initial handshake, denoted psk_secret(0) 372, which is zero during the initial handshake, a KDF Extract function is performed using the joiner secret, followed by an ExpandwithLabel function 374, to produce an epoch secret (epoch_secret(1)) 376.

At each epoch, a transport encryption key is exported from the key schedule as follows. In the initial handshake, after the Welcome message is sent, the current transcript hash is the welcome_transcript_hash, and so the early data secret derived as:

```
early_data_secret = ExpandWithLabel (exporter_secret,
    "2MlsEarlyData",
    welcome_transcript_hash, KDF.Nk)
```

Thus, the epoch_secret(1) is used as the init_secret(1) 378 (also called early_data_secret) and the exporter_secret(1) 380.

This secret is then provided to the transport encryption layer, so that it can use it to protect early data messages.

Once the confirmation message has been sent, the transport secret for the epoch 1 is derived as:

```
transport_secret = ExpandWithLabel (exporter_secret, "2MlsTransport",
confirm_transcript_hash, KDF.Nk)
```

The epoch secret is thus used to derive a number of values for different purposes, including to derive deriving keys to encrypt sender data, e.g., the init. traffic key(1) 382 and resp. traffic key(1) 384, the exporter_secret used to derive exported secrets, the confirmation_key involved in computing the confirmation MAC for an epoch, etc.

Thus, the Initiator traffic key (init. traffic key(1)) 382 and the Responder traffic key (resp. traffic key(1)) 384 are generated from the exporter secret using the ExpandWithLabel function shown above.

In a subsequent handshake, a commit_secret(1) 386 for the next epoch is provided as input to an ExpandWithLabel function 388 to produce a Joiner Secret 390, which is then provided to a KDF.Extract function 392, which takes as input a null psk_secret(1) 394, followed by an ExpandWithLabel function 396, and so on, similar to operations 376, 378, etc., shown above in FIG. 3B.

Retry

As explained above in connection with FIG. 3A, if the Responder does not support the cipher suite offered by the Initiator, but does support another cipher suite listed in the Initiator's capabilities, the Responder responds with a Retry message, and the handshake switches. The Retry message contains the Responder's key package, and this key package needs to correspond to one of the protocol versions and cipher suites indicated in the capabilities section of the Initiator's key package.

```
struct {
    2MlsKeyPackage key_package;
} 2MlsRetry,
```

Then, the Initiator responds with the Welcome message (instead as the Responder would in the regular flow shown in FIG. 3A). The transcript hashes used in the Welcome message are computed as follows:

```
key_package_transcript_hash = Hash (2MlsKeyPackage | | 2MlsRetry)
welcome_transcript_hash_tbm = Hash (2MlsKeyPackage | |
2MlsRetry | |
2MlsWelcomeTBM)
```

The subsequent confirmation message goes from the Responder to the Initiator and is computed as usual, using the transcript hash as follows:

```
welcome_transcript_hash = Hash (2MlsKeyPackage | | 2MlsRetry | |
2MlsWelcome)
```

The final transcript hash then becomes:

```
confirm_transcript_hash = Hash (2MlsKeyPackage | | 2MlsRetry | |
2MlsWelcome
| | 2MlsConfirm)
```

Pre-Published Key Package

As described above, in some settings, an Initiator may be willing to upload key packages to a key server, so that one or more Responders can download the Initiator's key package and thereafter directly send Welcome messages to the Initiator. This is referred to as a Prekey Flow. It is similar to the regular 2MLS handshake flow shown in FIG. 3A, except that the first Key Package message is sent/downloaded out-of-band via a key server to a Responder.

It is noted that if the Initiator is willing to accept multiple Welcome messages encrypted to the same key package, then the Welcome message in the Prekey Flow becomes vulnerable to replay attacks. Furthermore, in this case, the Early Data messages are also vulnerable to replay and are not forward secret if the key package's decryption key is eventually compromised. These messages essentially have the same security as 0-RTT messages in TLS 1.3.

One way to strengthen the security of these messages is to impose a one-time use only policy on uploaded key packages. Otherwise, the Responder should not send any Early Data until it receives the confirmation message from the Initiator. Furthermore, if key packages are reused, the Initiator should ensure that it does not accept any Welcome message twice.

In the Prekey Flow, the Initiator may send an update message immediately after the confirm message so that it can refresh the session keys and obtain strong forward secrecy guarantees.

Key Update with Post-Compromise Security

Figure 4:
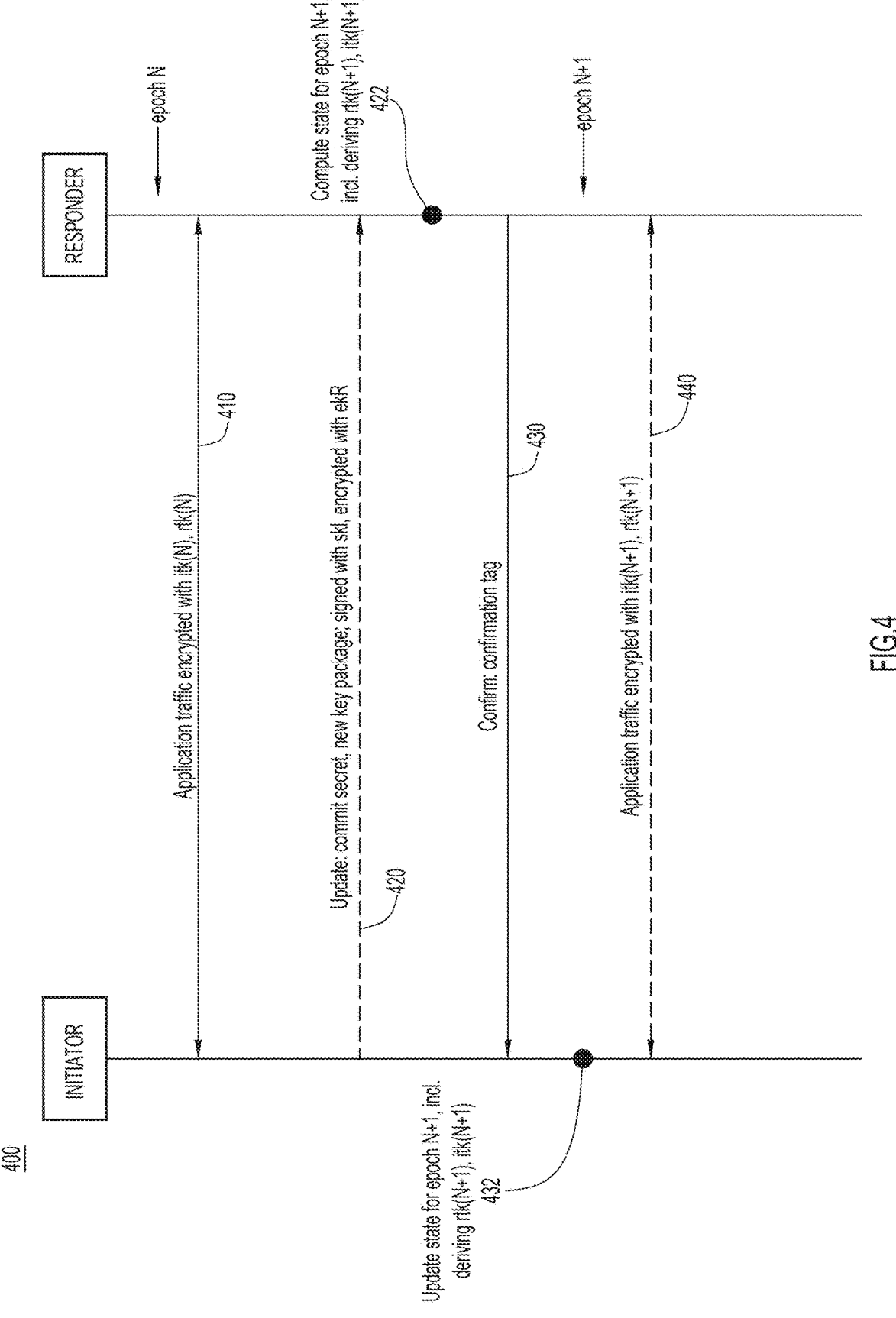
FIG. 4 is a sequence diagram for a key update process that provides for post-compromise security, according to an example embodiment.

Reference is now made to FIG. 4, which illustrates a sequence diagram for a key update process 400 that provides post-compromise security and opens new epochs. Each epoch creates a new exporter_secret and a new confirm_transcript_hash and the transport_secret is derived in the same way as described above. At any point after the initial handshake, either party can ratchet the protocol to obtain a fresh key, providing forward secrecy (FS) and post-compromise security (PCS). Thus, as shown at 410, the Initiator and Responder are communicating application traffic for epoch N using the Initiator transport key itk(N) and the Responder transport key rtk(N).

At some point, one of the parties decides to update the keys for communicating with the other party. In the example shown in FIG. 4, the Initiator is the party that initiates the key update, but this is only an example as the Responder could just as well trigger the key update. At 420, the Initiator sends an update message. The update message includes a fresh commit_secret for the next epoch and a new key package containing a fresh encryption key and (optionally) a new credential and signature key. The update message is subject to a message authentication code (MAC) computation using the previous confirm_transcript_hash as context, signed with the Initiator's signature key (skI) and encrypted with the peer's encryption key, in this case the Responder's encryption key (ekR), using the same pattern as the aforementioned Welcome message:

```
struct {
    opaque commit_secret<V>; opaque
    session_id<V>; uint32 epoch;
    2MlsSenderKeyPackage new_key_package;
] 2MlsUpdateTBM;
struct {
    2MlsUpdateTBM update_tbm;
    /* MAC (update_key, update_transcript_hash_tbm) */ Mac
    update_tag;
} 2MlsUpdateTBS;
struct {
    2MlsUpdateTBS update_tbs;
    /* SignWithLabel (signing_key, "2MlsUpdate", 2MlsUpdateTBS) */
    optional<opaque> signature<V>
} 2MlsUpdateTBE;
```

If the new_key_package does not contain a new signature key, then the signature field in update_tbs is left empty.

At step 422, the Responder re-runs the key schedule to derive new keys for the new epoch, N+1, using the previous init_secret, the new commit_secret, and using the update_transcript_hash_tbm as the new GroupContext. This yields a new exporter_secret that is use to derive the update_key:

```
update_transcript_hash_tbm = Hash (previous_confirm_transcript_
hash | | 2MlsUpdateTBM)
update_key = DeriveSecret (exporter_secret, "2MlsUpdate")
update_tag = Mac (update_key, update_transcript_hash_tbm)
```

After sending the update, the transcript hash becomes:

```
update_transcript_hash = Hash (previous_confirm_transcript_hash | |
2MlsUpdate)
```

Upon receiving the update message, the peer, in this case the Responder, responds, at step 430, with a confirmation message that includes the confirmation tag computing using the key derivation:

```
confirmation_key = DeriveSecret (exporter_secret,
"2MlsUpdateConfirm")
confirmation_tag = Mac (confirmation_key, update_transcript_hash)
```

Then the confirm_transcript_hash is updated:

```
confirm_transcript_hash = Hash (previous_confirm_transcript_hash | |
2MlsUpdate | | 2MlsConfirm)
```

At step 432, the Initiator can now derive the transport keys rtk(N+1) and itk(N+1) for the new epoch (epoch N+1) using the exporter_secret and the new confirm_transcript_hash.

Like an update in MLS (RFC9420), this update allows updating the entire leaf node.

After receiving and checking the update confirmation message from the other party, the updating party needs to switch to the new epoch and transport keys. Until the confirmation message is processed, the old keys are being used.

At 440, the Initiator and Responder can now send application traffic encrypted with the new transport keys, itk(N+1) and rtk(N+1), respectively.

In the event that both sides send an update message, each side will recognize the conflict and refuse to send a confirmation message. After a period of time, each side will notice that it has not received a confirmation message from the other side, and retry the update.

Upgrading to Full MLS

Figure 5:
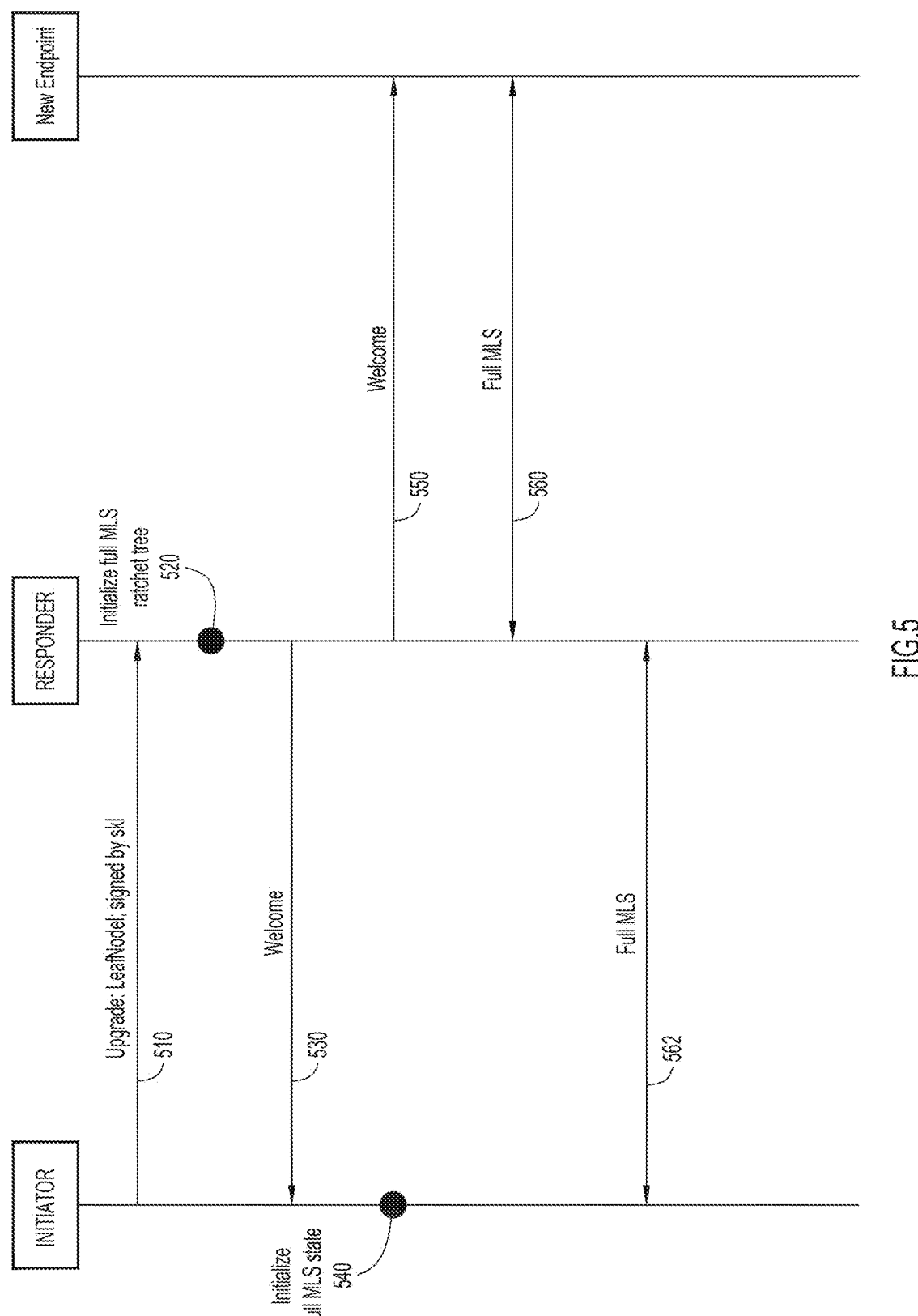
FIG. 5 a sequence diagram depicting a process by which a party in a one-to-one secure channel session requests the other party to upgrade to a full Message Layer Security (MLS) group, according to an example embodiment.

Reference is now made to FIG. 5. FIG. 5 illustrates a sequence diagram depicting a process 500 by which either party may ask its peer to upgrade to a full MLS group. At step 510, the requesting party, in this example, the Initiator, sends an upgrade message that contains a leaf node. The upgrade message is signed using the Initiator's signature key (skI). The structure of the upgrade message may take the form of:

```
struct {
    LeafNode sender_leaf_node;
} 2MlsUpgradeTBM;
struct {
    2MlsUpgradeTBM upgrade_tbm;
    /* MAC (upgrade_confirmation_key, upgrade_transcript_hash_tbm)
    */ Mac
    upgrade_confirmation_tag;
} 2MlsUpgradeTBS;
struct {
    2MlsUpgradeTBS upgrade_tbs;
    /* SignWithLabel (leaf_signing_key, "2MlsUpgrade",
    2MlsUpgradeTBS) */
    opaque signature<V>
} 2MlsUpgrade;
```

The corresponding secrets and hashes are derived as:

```
upgrade_transcript_hash_tbm = Hash (previous_confirm_transcript_
hash | | 2MlsUpgradeTBM)
upgrade_confirmation_key = DeriveSecret (exporter_secret,
"2MlsUpgradeConfirmation")
upgrade_confirmation_tag = Mac (upgrade_confirmation_key,
upgrade_transcript_hash_tbm)
```

Upon receiving the upgrade request, if the peer (in this case the Responder) agrees to upgrade to an MLS group (adding a party beyond the Initiator and Responder), then at step 520, the Responder creates a new MLS group consisting of the two parties and at step 530 sends a normal MLS Welcome message to the other party. The only difference is that the GroupSecrets used in this Welcome message contains at least one pre-shared key (psk), and this psk uses the PreSharedKeyID corresponding to 2MlsUpgrade_<session_id>, and the corresponding pre-shared key is derived as:

```
upgrade_psk_id = "2MLSUpgrade_" | session_id
upgrade_psk_secret = ExpandWithLabel (exporter_secret,
"2MlsUpgradePSK",
upgrade_transcript_hash_tbm, KDF.Nk)
```

This process of upgrading to a group ensures that both participants of the original conversation agree to move to a group conversation. At step 540, the Initiator initializes its state to the full MLS state.

Once both parties have initiated the MLS group, they can freely add other parties as usual. Thus, at step 550, the Responder sends a Welcome message to the New Endpoint. Thereafter, a full (multi-party) MLS session exists among the Initiator, Responder and New Endpoint as shown at 560 and 562.

Figure 6A:
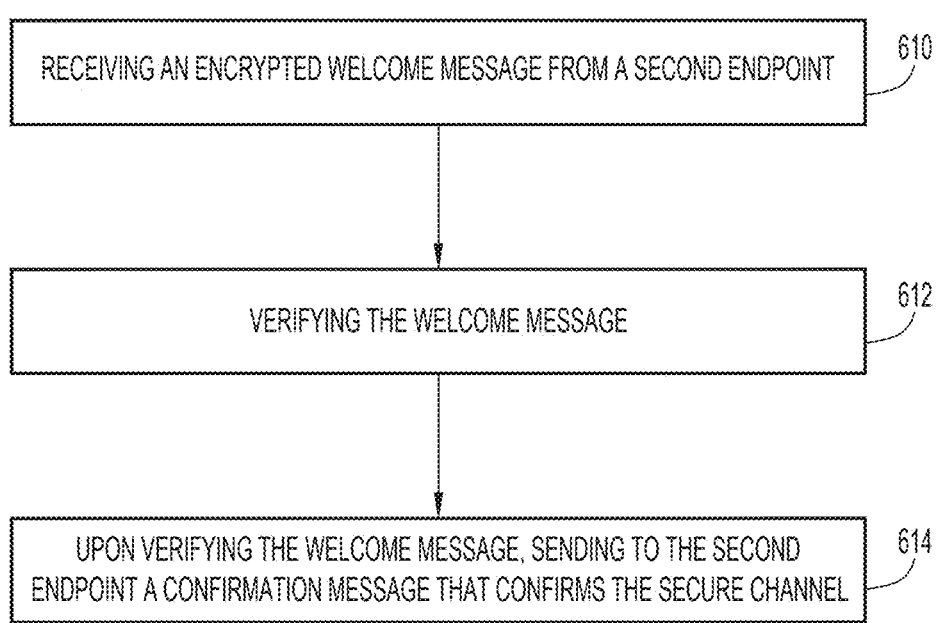
FIG. 6A is a flow chart depicting, at a high-level, a method involving operations performed by one party (an Initiator) in a one-to-one secure channel handshake, according to an example embodiment.

FIG. 6A is a flow chart depicting, at a high-level, a method 600 comprising operations performed the Initiator (also called "first endpoint"), in a one-to-one (2MLS) secure channel handshake.

At step 610, the method 600 comprises receiving from the second endpoint a welcome message. More specifically, the welcome message is encrypted and comprises: welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript comprises a first endpoint key package and the welcome content; and a signature computed over the welcome content and the welcome tag using a second endpoint signature key.

At step 612, the first endpoint verifies the welcome message. This involves the first endpoint: decrypting the welcome message using a first endpoint private decryption key that corresponds to a first endpoint ephemeral public encryption key (that is part of the first endpoint key package which the second endpoint has obtained); verifying the signature of the welcome message using the second endpoint signature verification key; and verifying the welcome tag in the welcome message.

At step 614, upon the first endpoint verifying the welcome message, the first endpoint sends to the second endpoint a confirmation message that confirms the one-to-one secure channel.

The method 600 may further include the first endpoint and the second endpoint engaging in (conducting) secure messaging using transport encryption keys derived from a key schedule.

Verifying the welcome tag at step 612 includes: recomputing a welcome transcript to produce a recomputed welcome transcript and generating a derived welcome key from the recomputed welcome transcript, recomputing a message authentication code using the recomputed welcome transcript and the derived welcome key to produce a recomputed message authentication code, and comparing the recomputed message authentication code with the message authentication code of the welcome message. When the recomputed message authentication code and the message authentication code of the welcome message match, the welcome tag (and thus the welcome message) is verified.

The method 600 further includes the first endpoint: generating a confirmation tag based on a message authentication code operation performed over a confirmation key and a hash of the welcome transcript, wherein the confirmation key is derived from an exporter secret; and including the confirmation tag in the confirmation message. The method 600 may further involve the first endpoint deriving, from the exporter secret, new transport keys for secure messages to be sent to the second endpoint in a next epoch.

As described above, the first endpoint may derive from the exporter secret, new transport keys to use for secure messages to the sent to the second endpoint in a next epoch.

Further, as described above in connection with FIG. 4, the first endpoint or the second endpoint may initiate a key update by sending to the other endpoint (the other of the first endpoint or second endpoint) an update message that contains a fresh commit secret for a next epoch and a new key package that includes a fresh encryption key that is signed with a signature key of the first endpoint or the second endpoint that sent the update message, and encrypted with an encryption key of the other endpoint. When the other endpoint receives the update message, the other endpoint performs operations of: generating a confirmation key from an exporter secret over the hash of the welcome transcript; generating a confirmation tag based on a message authentication code operation performed over the confirmation key; and sending a confirmation message containing the confirmation tag, wherein the first endpoint and the second endpoint derive, from the exporter secret and the transcript hash, new transport keys for secure messages to be sent to the other endpoint in a next epoch.

As described above in connection with FIG. 5, the first endpoint or the second endpoint may send an upgrade request message to the other endpoint to convert the one-to-one secure messaging session to a group messaging session. Upon the other endpoint agreeing to upgrade to a group messaging session, a welcome message is received from the other endpoint that contains at least one pre-shared key derived from keying material generated by the other endpoint during the one-to-one secure messaging session. As explained above in connection with FIG. 5, wherein the upgrade request message may further indicate to add that at least a third endpoint to the group messaging session.

Figure 6B:
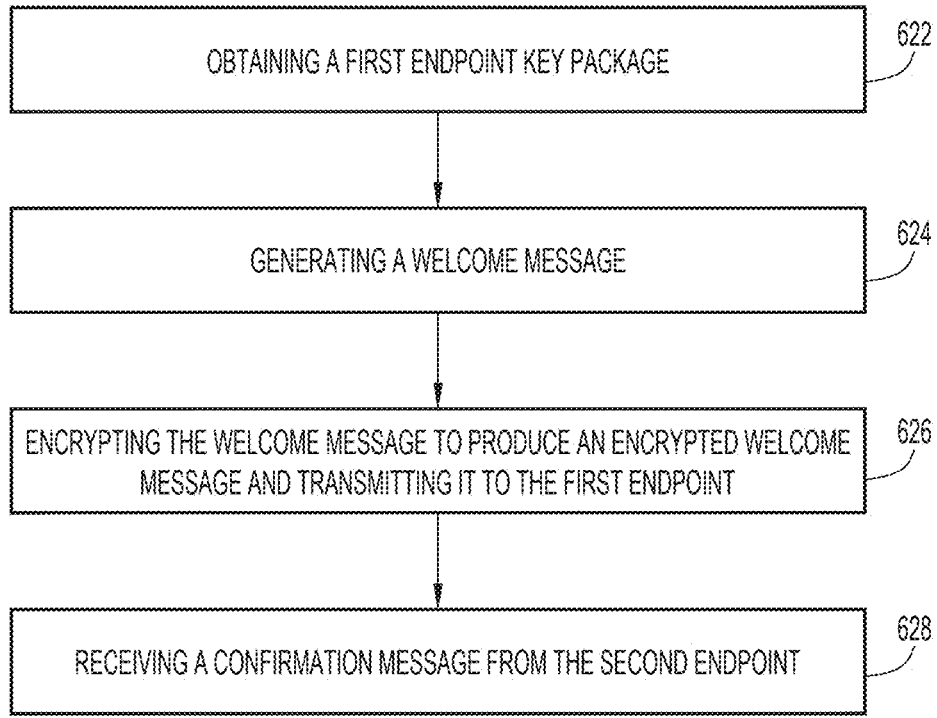
FIG. 6B is a flow chart depicting, at a high-level, a method involving operations performed by one party (an Responder) in a one-to-one secure channel handshake, according to an example embodiment.

Turning now to FIG. 6B, a flow chart is shown depicting a method 620 performed by at a Responder Initiator (also called "second endpoint"), in a one-to-one (2MLS) secure channel handshake. The method 620 involves, at step 622, obtaining a first endpoint key package. The first endpoint key package includes a first endpoint ephemeral public encryption key and a first endpoint signature verification key corresponding to a first endpoint signature key, wherein the first endpoint key package is signed with the first endpoint signature key. The second endpoint verifies a signature of the first endpoint key package using the first endpoint signature verification key included in the key package.

At step 624, the method 620 includes generating a welcome message to be sent to the first endpoint. The welcome message comprises: welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript comprises the first endpoint key package and the welcome content; and a signature computed over the welcome content and welcome tag using a second endpoint signature key.

At step 626, the method 620 includes encrypting the welcome message using the first endpoint ephemeral public encryption key to produce an encrypted welcome message and transmitting the encrypted welcome message to the first endpoint.

At step 628, the method 620 includes, upon the first endpoint decrypting the welcome message, verifying the signature of the welcome message using the second endpoint signature verification key, and verifying the welcome tag by recomputing a message authentication code using the welcome transcript and the welcome key, receiving from the first endpoint a confirmation message.

Step 622 of obtaining the first endpoint key package may involve obtaining the first endpoint key package in a message received from the first endpoint or by downloading the key package from a server.

The method 620 may further include engaging in secure messaging between the first endpoint and the second endpoint using transport encryption keys derived from a key schedule.

As described above, the 2MLS handshake described above is executed between an Initiator and a Responder, and results in the two parties having shared cryptographic state that they use to encrypt content within the secure channel. When the transport protocol has a notion of an Initiator and a Responder, these may be different from the 2MLS roles. The 2MLS protocol is defined in terms of messages sent by each party in a particular order. Presented herein in connection with FIGS. 7-10 are various techniques for transmitting those messages over the Internet, and in particular instantiations of 2MLS secure channels over the Transmission Control Protocol (TCP), the QUIC protocol over UDP, 2MLS over an Application Delivery Service, the HTTP over 2MLS, and 2MLS over User Datagram Protocol (UDP).

2MLS over TCP

Figure 7:
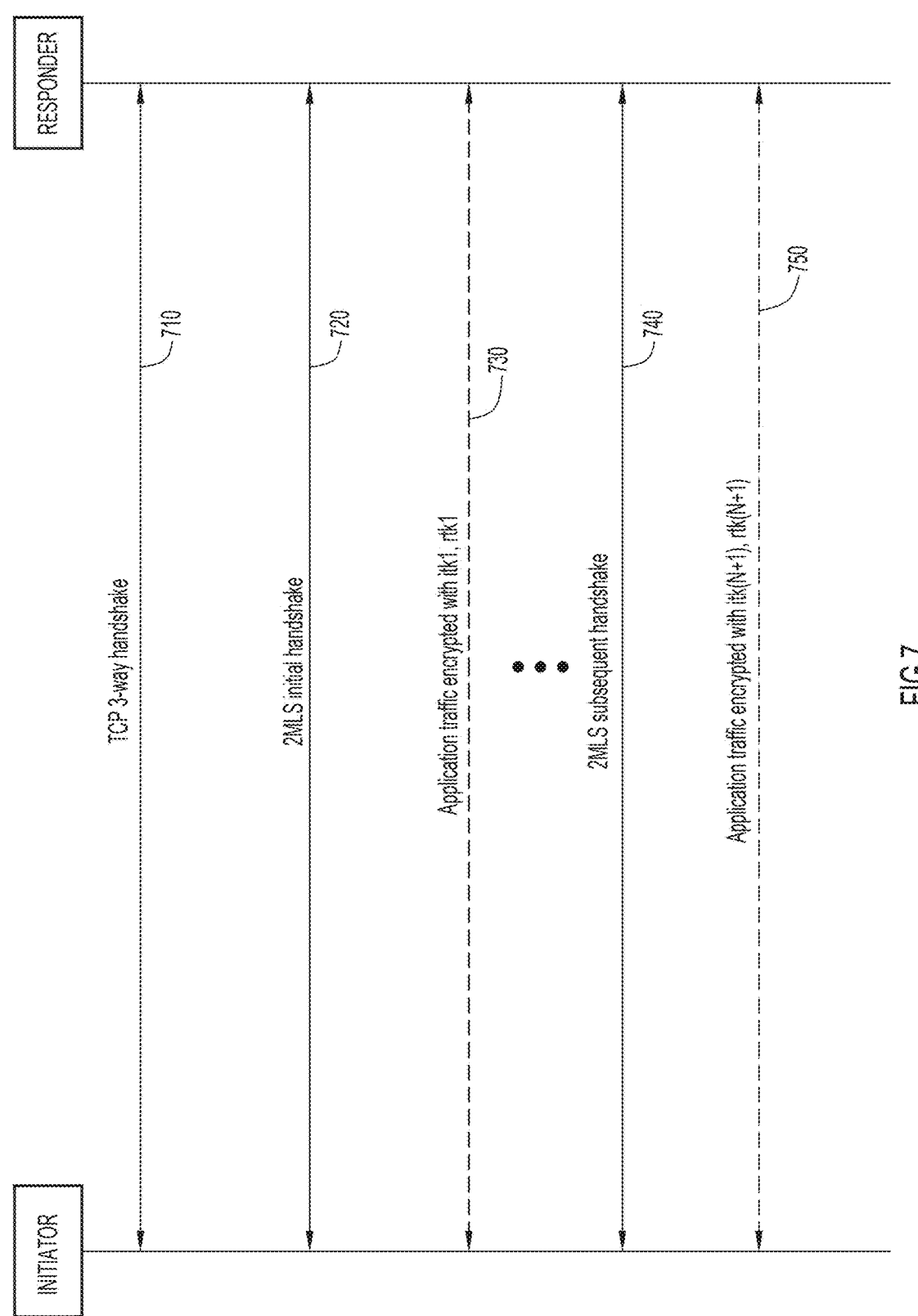
FIG. 7 is a sequence diagram depicting a process to instantiate a one-to-one secure channel over the Transmission Control Protocol (TCP), according to an example embodiment.

Reference is now made to FIG. 7, which shows a sequence diagram for a process 700 to instantiate 2MLS over TCP. TCP has initiator and responder roles. These may be aligned with the 2MLS roles, or reversed. Whether they are aligned or reversed is determined by configuring the two endpoints using any of a variety of techniques now known or hereinafter developed.

The transport-layer initiator initiates a TCP connection to the responder. The two parties complete the TCP handshake, as shown at 710.

At 720, the 2MLS Initiator initiates the 2MLS handshake process that is shown in FIG. 3A and described above. The two parties complete the 2MLS handshake over the TCP connection. 2MLS messages are sent over the TCP connection. Each 2MLS message has a defined length that allows the receiver to know when it has read the whole message from the TCP stream.

Once the TCP handshake is complete, and the 2MLS handshake indicates that a party may send encrypted traffic, that party may transmit application data within the secure channel. This is shown at 730, where application traffic is encrypted with the Initiator traffic key (itk1) and the Responder traffic key (rtk1), for epoch 1. That is, application data is encrypted with keys derived from the 2MLS handshake, either using the 2MLS encapsulation or another encryption scheme that transforms segments of application data into Authenticated Encryption with Associated Data (AEAD)-encrypted, defined-length messages. These messages are then transmitted over the TCP connection.

At any time, either party to the connection may initiate a refresh of the keys for the connection by sending a 2MLS Commit message to initiate a 2MLS subsequent handshake, as shown at 740. If this message is accepted by the other party, then the 2MLS handshake will provide each party with a new encryption key, and the parties will begin using those keys to protect application content, as shown at 750, where the parties use new keys, itk(N+1) and rtk(N+1).

To summarize the process 700 in FIG. 7, the first endpoint or the second endpoint initiate a Transmission Control Protocol (TCP) handshake with the other endpoint. Upon completion of the TCP handshake and establishing of a TCP connection between the first endpoint and the second endpoint, the first endpoint receives the Welcome message from the second endpoint over the TCP connection, and the first endpoint sends the Confirmation message over the TCP connection. Upon completion of the one-to-one secure channel handshake, either of the first endpoint or the second endpoint transmit messages, with application data encrypted with encryption keys derived from the one-to-one secure channel handshake, over the TCP connection.

2MLS Over QUIC

Figure 8:
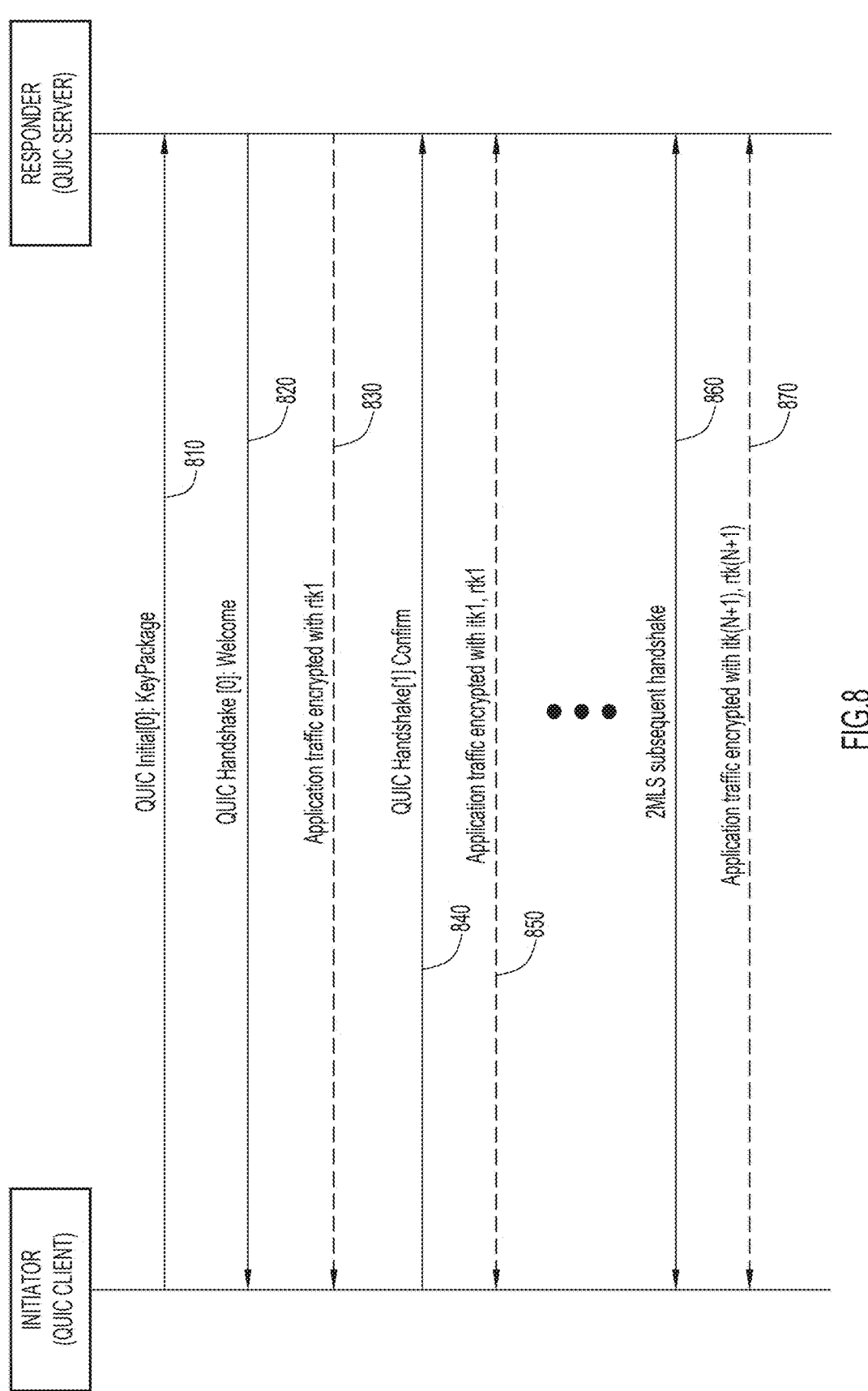
FIG. 8 is a sequence diagram for a process to instantiate a one-to-one secure channel over the QUIC protocol, according to an example embodiment.

The QUIC protocol, defined in IETF RFC 9000, provides a generic framework for integrating a 3-message cryptographic handshake. QUIC is an example of an encrypted connection-oriented protocol. FIG. 8 illustrates a sequence diagram for a process 800 to instantiate the 2MLS secure channel handshake and subsequent communications over the QUIC protocol. The 2MLS handshake plays the role of the 3-message cryptographic handshake of the QUIC protocol.

In the QUIC framework, the client always sends the first cryptographic handshake message. Thus, the QUIC client is the 2MLS Initiator and the QUIC server is the Responder.

The messages comprising the 2MLS handshake are carried by QUIC according to the QUIC framework. Thus, at 810, the Initiator sends to the Responder the Initiator's key package in the QUIC Initial[0] message. At 820, the Responder sends in the QUIC Handshake[0] message the 2MLS Welcome message that includes the Responder's key package. At 830, the Responder can start sending encrypted application traffic to the Initiator using the Responder traffic key rtk1. At 840, the Initiator sends a 2MLS confirmation message in the QUIC Handshake[1] message. Thereafter, both parties can send application traffic encrypted with the Initiator traffic key itk1 and Responder traffic key rtk1, as shown at 850. Moreover, once the 2MLS handshake is completed, keys derived from the 2MLS handshake are used for QUIC packet protection using the standard QUIC packet encryption scheme.

Optionally, there may be an extension to the QUIC protocol to allow key refresh mid-session. One side sends a 2MLS Commit message. If this message is accepted by the other party, then the 2MLS protocol will provide each party with a new encryption key, and the parties will begin using those keys to protect application content. This is shown at 860 and 870 in FIG. 8.

Thus, to summarize the process 800 depicted in FIG. 8, the Welcome message and the Confirmation message are carried in respective handshake messages of an encrypted connection-oriented protocol, wherein upon completion of the one-to-one secure channel handshake over the encrypted connection-oriented protocol, keys derived from one-to-one secure channel handshake are used to encrypt packets transmitted via the encrypted connection-oriented protocol.

2MLS over Application Transport

Figure 9:
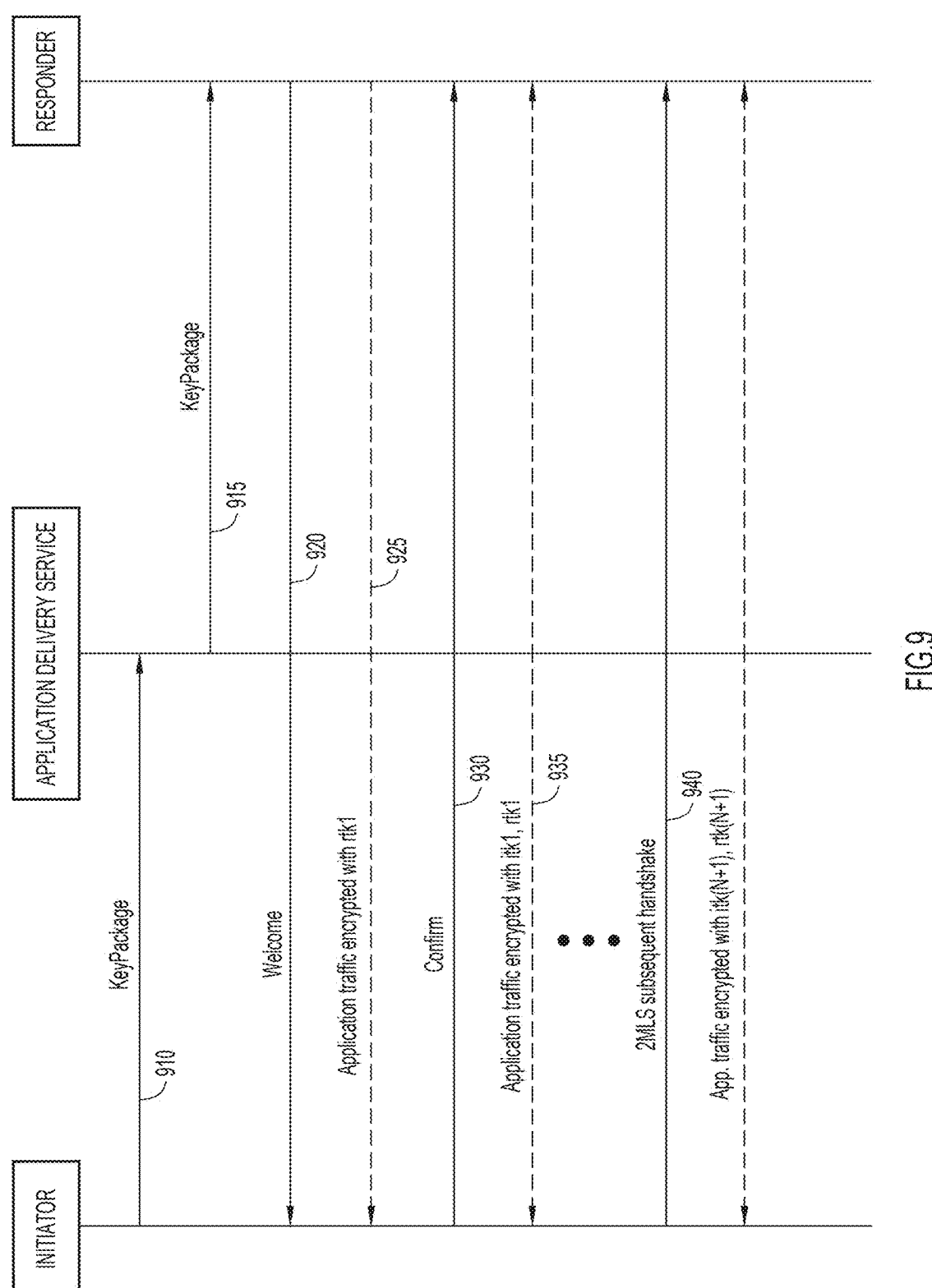
FIG. 9 is a sequence diagram for a process in which an Application Delivery Service is an intermediary party between parties engaging in the 2MLS secure channel techniques, according to an example embodiment.

FIG. 9 illustrates a sequence diagram for a process 900 in which an Application Delivery Service is an intermediary party between the Initiator and the Responder. An example of such an Application Delivery Service is a messaging server, and the two devices are communicating asynchronously, with the Application Delivery Service in the middle.

At 910, the Initiator sends a message containing its key package to the Application Delivery Service. The Application Delivery Service forwards the message with the Initiator's key package to the Responder, at 915.

Thereafter the flow is similar to that described above in connection with FIG. 3A.

At 920, the Responder sends to the Initiator a Welcome message. At that point, the Responder can send application traffic encrypted with the Responder traffic key rtk1 to the Initiator, as shown at 925.

At 930, the Initiator sends a Confirm message to the Responder. At this point, the two parties can exchange encrypted application traffic using their traffic keys, itk1 and rtk1, as shown at 935.

Furthermore, the parties may do a 2MLS subsequent handshake at 940 to update their keys, and then continue sending traffic with updated traffic keys itk(N+1) and rtk (N+1) at 945.

HTTP over 2MLS

Currently, the Hypertext Transfer Protocol Secure (HTTPS) protocol uses the Transport Layer Security (TLS) protocol as its security layer. 2MLS offers similar functionality to TLS, but with better security properties, such as for example, the ability to easily use post-quantum cryptography or the ability to rotate the credentials used by either party to the connection. In some applications of HTTPS, it may be desirable to have the additional security properties that 2MLS can provide.

Figure 10:
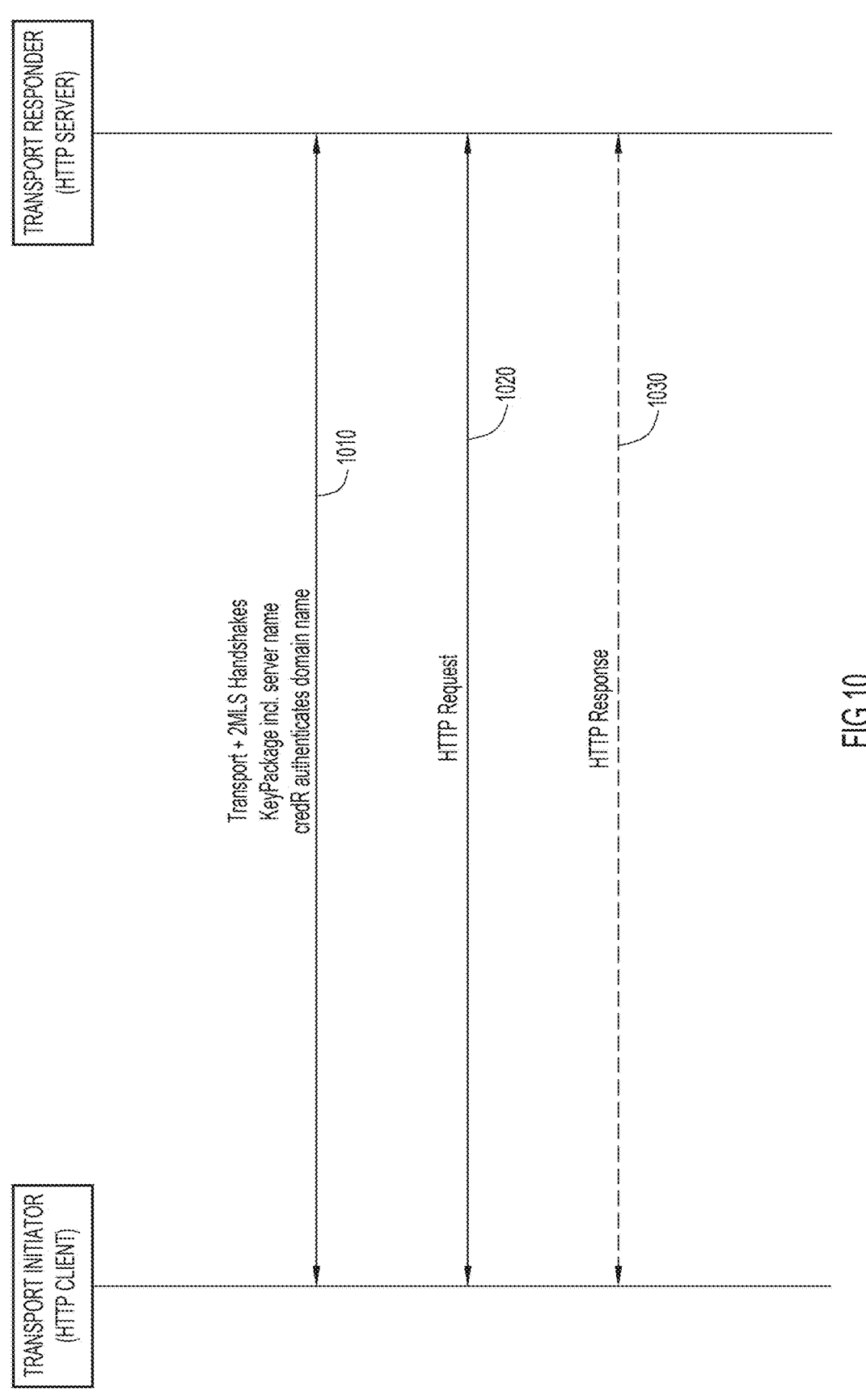
FIG. 10 is a sequence diagram depicting a process by which encrypted traffic is transported by the Hypertext Transfer Protocol (HTTP) over a one-to-one secure channel, according to an example embodiment.

FIG. 10 shows a sequence diagram depicting a process 1000 by which encrypted traffic is transported by HTTP over 2MLS. The techniques described with respect to FIG. 10 presumes that a 2MLS connection is carried over some Internet transport, such as TCP or QUIC, as described above. The transport layer has initiator and responder roles, which may map to the 2MLS initiator or responder roles either directly or reversed. In the techniques described below, the HTTP client is the transport initiator and the HTTP server is the transport responder, regardless of 2MLS roles.

At 1010, the transport and 2MLS handshakes are performed between the transport initiator and transport Responder. The 2MLS key package includes the HTTP server name, and the Responder credential (credR) authenticates the domain name of the HTTP server. The HTTP server name acts as the identity of the HTTP server.

If the HTTP client is the 2MLS Initiator, the HTTP client initiates the underlying transport connection to the HTTP server. In the client's first 2MLS message, the client sends a transport initiation message that includes an extension that indicates the identity of the server that the client seeks to connect to, analogous to the TLS server_name extension. The client may also include an extension that indicates the application-layer protocols (e.g., the versions of HTTP) that the client supports. These extensions are carried in the extensions field of the KeyPackage object sent in the Initiator's first message.

In the server's first 2MLS message, the server includes a credential credR that matches the identity indicated by the client. If the client included an extension expressing support for a set of application-layer protocols, then the server includes an extension in its first message indicating which application-layer protocol (which version of HTTP) is to be used over the 2MLS connection. The remainder of the handshake proceeds as normal for 2MLS.

If the client is the 2MLS Responder, the server pre-publishes its first message, including a credential authenticating the domains that the server is willing to represent as an HTTP server. The server may also include an extension that indicates the application-layer protocols (e.g., the versions of HTTP) that the client supports. This extension, if present, is carried in the extensions field of the KeyPackage object sent in the Initiator's first message In the client's first 2MLS message, if the server's first message included an extension expressing support for a set of application-layer protocols, then the client includes an extension in its first message indicating which application-layer protocol is to be used over the 2MLS connection.

The remainder of the handshake proceeds as normal for 2MLS.

In either case, after the initial handshake at 1010, at 1020, HTTP requests are sent using the negotiated application-layer protocol. The client only sends requests for server identities that the server has authenticated in its 2MLS credentials. HTTP responses are sent at 1030.

Either the client or the server may update its credentials after the initial handshake. If the server does this, then the client will update the set of server identities for which it is willing to send requests. Likewise, if the client updates its credential, then the server will update the set of identities that it associates with the client. The server may request that the client present additional identities by sending a WWW-Authenticate header.

Thus, in one form, the process 1000 depicted in FIG. 10 involves a first endpoint (Transport Initiator) acting as an HTTP client and a second endpoint (Transport Responder) acting as an HTTP server. The first endpoint sends to the second endpoint a transport initiation message to initiate a transport connection to the second endpoint, the transport initiation message indicating an identity of the HTTP server that the first endpoint seeks to connect to, wherein the Welcome message sent by the second endpoint includes a credential that matches the identity indicated in the transport initiation message. The identity of the HTTP server and an indication of application-layer protocols supported by the first endpoint may be included the first endpoint key package. Moreover, the Welcome message sent by the second endpoint further includes an indication of which particular application-layer protocol is to be used over the one-to-one secure channel, and thereafter the first endpoint initiates an HTTP request to the second endpoint using the particular application-layer protocol.

In another form, the process 1000 of FIG. 10, the second endpoint (Transport Responder) acts an HTTP client and the first endpoint (Transport Initiator) acts as an HTTP server. In this case, the first endpoint pre-publishes an initial message that includes a credential authenticating one or more domains that the first endpoint is to represent as an HTTP server. Moreover, the initial message that the first endpoint pre-publishes further includes an indication of a set of application-layer protocols supported by the first endpoint, the Welcome message sent by the second endpoint includes an indication of a particular application-layer protocol is to be used over the one-to-one secure channel, and thereafter the second endpoint initiates an HTTP request to the first endpoint using the particular application-layer protocol.

2MLS Over UDP

In this realization, 2MLS messages are sent within datagrams of a framing protocol, such as the User Datagram Protocol (UDP) datagrams, possibly fragmented across multiple datagrams. UDP is an example of a framing protocol that can fragment messages. The two parties use a standard UDP fragmentation and reassembly algorithm, e.g., the algorithm used by DTLS.

Figure 11:
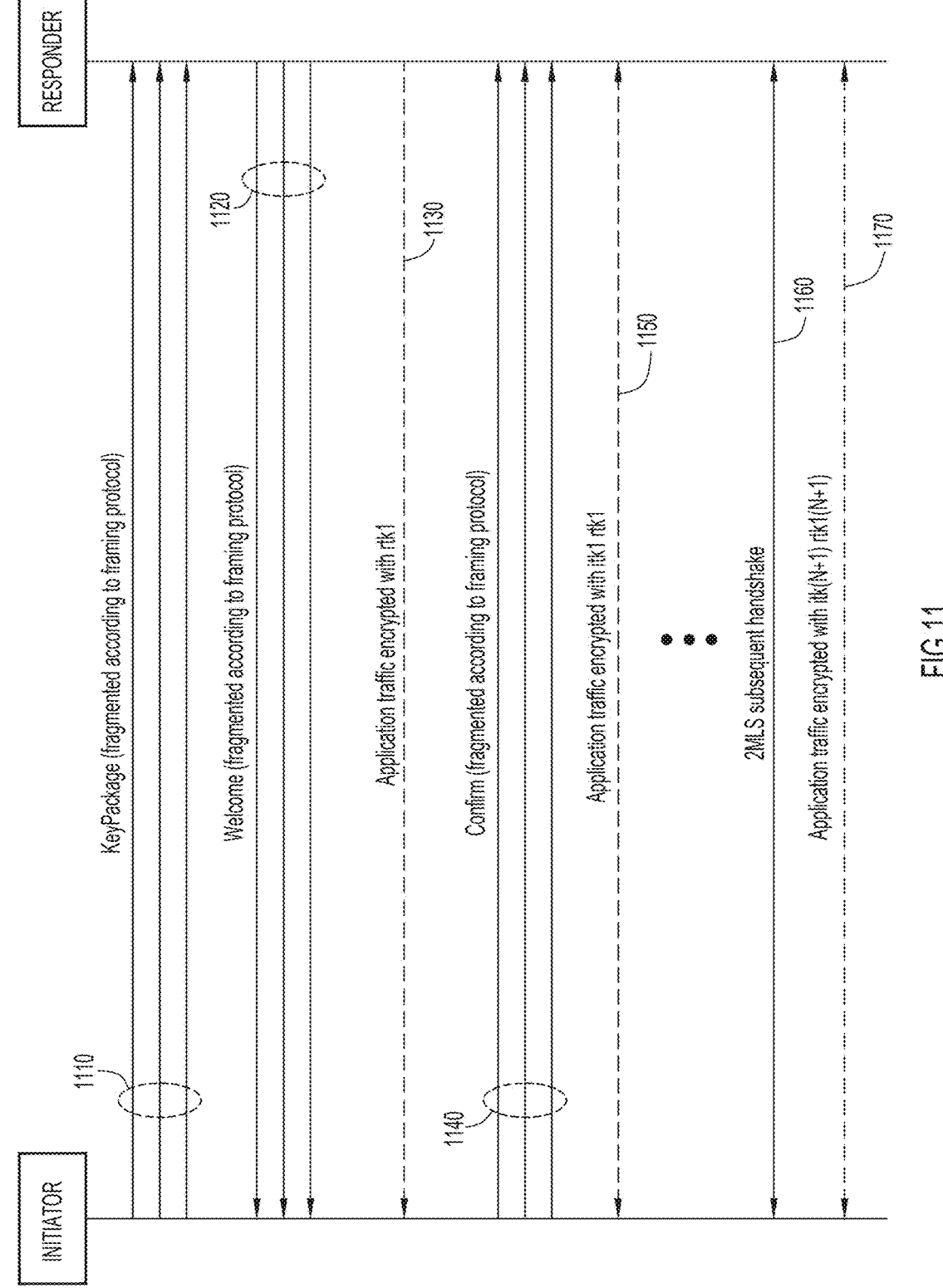
FIG. 11 is a sequence diagram depicting a process by which a one-to-one secure channel is instantiated over the User Datagram Protocol (UDP), according to an example embodiment.

Reference is now made to FIG. 11, which shows a process 1100 by which the 2MLS handshake and subsequent secure channel communication are performed, according to an example embodiment.

UDP does not have initiator and responder roles. Thus, at 1110, the 2MLS Initiator begins by sending a KeyPackage message to the Responder in a sequence of UDP datagrams. The KeyPackage message includes the Initiator's key package, as described above in connection with FIG. 3A. At 1120, the Responder sends a Welcome message, possibly fragmented over a sequence of UDP datagrams. Thereafter, the Responder may send to the Initiator, Early Data encrypted with the Responder traffic key, rtk1, as shown at 1130. At 1140, the Initiator sends a Confirm message, which again, may also be fragmented over a sequence of UDP datagrams. Thereafter, the Initiator and Responder can send traffic to each other encrypted with their respective traffic keys, itk1 and rtk1, as shown at 1150.

Thus, as shown in FIG. 11, the two parties complete the 2MLS handshake by exchanging messages using UDP datagrams. Once the 2MLS handshake is complete, and the 2MLS handshake indicates that a party may send data, that party may transmit application data within the secure channel. Application data is encrypted with keys derived from the 2MLS handshake, either using the 2MLS encapsulation or another encryption scheme that transforms segments of application data into AEAD-encrypted, defined-length messages. These messages are then transmitted in UDP datagrams.

At any time, either party to the connection may initiate a refresh of the keys for the connection by sending a 2MLS Commit message, as shown at 1160. If this message is accepted by the other party, then the 2MLS protocol will provide each party with a new encryption key, and the parties will begin using those keys to protect application content, as shown at 1170.

Thus, to summarize, the process 1100 of FIG. 11 involves the Welcome message and the Confirmation message being fragmented according to a framing protocol. In one example, the framing protocol is the User Datagram Protocol (UDP), and the Welcome message and the Confirmation message are fragmented across a sequence of UDP datagrams.

Security Aspects

The 2MLS related techniques presented herein provide secure channels between to participants in the presence of a classic network adversary who controls the network, and hence can intercept, modify, replay, and redirect protocol messages. The adversary may also control some endpoints and may be able to compromise the signature and decryption keys used by honest participants, or even the internal session state at some participants.

2MLS is configured to provide the following security guarantees:

Exporter Secret Confidentiality: In any epoch, if the exporter secret is known to the adversary, then one of the two parties involved in the session must be compromised (i.e., their signature or KEM keys or the PSK or session state must have been explicitly leaked to the adversary).

Exporter Secret Forward Secrecy: The exporter secret secrecy holds even if the signature key or PSK is compromised after the session is complete.

Exporter Secret Post-Compromise Security: The exporter secret secrecy holds after a Key Update flow, even if prior exporter secrets are subsequently compromised.

Mutual Authentication:

If the Initiator completes a regular handshake, then the Responder must have sent a matching Welcome, or the Responder's signature key must be compromised.

If the Responder completes a regular handshake, then the Initiator must have sent a matching KeyPackage and Confirm, or the Responder's signature key must be compromised.

Similar authentication guarantees for each party after the Retry, PSK-based Resumption, and Key Update flows.

Signature Key Compromise Impersonation Protection: The mutual authentication guarantees hold even if the recipient of a message is compromised.

Session Key Compromise Impersonation Protection: The mutual authentication guarantees hold even if the session key is compromised.

Replay Protection: When any party completes a handshake with an honest peer, there is a unique peer session that matches this session.

As corollaries of the key confidentiality and mutual authentication properties above, similar properties hold for any application messages protected using the transport keys.

Example User Device/Endpoint

FIG. 12 illustrates a hardware block diagram of a device 1200 that may perform functions associated with operations discussed herein in connection with the techniques depicted in FIGS. 1, 2A, 2B, 2C, 3A, 3B, 4, 5, 6A, 6B, 7-11. The device 1200 shown in FIG. 12 thus may be representative of a user device or endpoint that may be configured to perform the various 2MLS related operations described herein.

In at least one embodiment, the device 1200 may be any apparatus that may include one or more processor(s) 1202, one or more memory element(s) 1204, storage 1206, a bus 1208, one or more network processor unit(s) 1210 interconnected with one or more network input/output (I/O)

interface(s) 1212, one or more I/O interface(s) 1214, and control logic 1220. In various embodiments, instructions associated with logic for device 1200 can overlap in any manner and are not limited to the specific allocation of instructions and/or operations described herein.

In at least one embodiment, processor(s) 1202 is/are at least one hardware processor configured to execute various tasks, operations and/or functions for device 1200 as described herein according to software and/or instructions configured for device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with device 1200, and/or logic configured for memory element(s) 1204 and/or storage 1206. For example, any logic described herein (e.g., control logic 1220) can, in various embodiments, be stored for device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of device 1200 to communicate in order to exchange information and/or data. Bus 1208 can be implemented with any architecture designed for passing control, data and/or information between processors, memory elements/storage, peripheral devices, and/or any other hardware and/or software components that may be configured for device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to device 1200. For example, I/O interface(s) 1214 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

To enable interface with a user in order to allow a user to enter content (text, images, video, etc.) to be transmitted and to receive and present content from a far end device, The device 1200 may further include a keyboard/mouse 1230, a speaker 1232, a microphone 1234, a display 1236 and a camera 1238 (e.g., a video camera). The display 1236 may have touch-screen input capabilities, making the keyboard/mouse 1230 unnecessary.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In particular, the control logic 1220 or other software instructions stored in memory elements 1204, may include instructions that, when executed by the processor(1) 1202, enable the device 1200 to perform the 2MLS operations described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, presented herein is a method, apparatus and non-transitory computer readable storage media (encoded with instructions to be executed by a processor) configured to carryout various techniques in connection with establishing a one-to-one secure channel between a first endpoint and a second endpoint by performing a one-to-one secure channel handshake.

In one form, the techniques described herein relate to a method to establish a one-to-one secure channel between a first endpoint and a second endpoint by performing a one-to-one secure channel handshake, the method performed by the first endpoint and including: receiving from the second endpoint, a welcome message including: welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript includes a first endpoint key package and the welcome content; and a signature computed over the welcome content and the welcome tag using a second endpoint signature key; verifying the welcome message by: decrypting the welcome message using a first endpoint private decryption key that corresponds to a first endpoint ephemeral public encryption key; verifying the signature of the welcome message using the second endpoint signature verification key; and verifying the welcome tag in the welcome message; and upon verifying the welcome message, sending to the second endpoint a confirmation message that confirms the one-to-one secure channel.

In some examples, the method further includes engaging in secure messaging between the first endpoint and the second endpoint using transport encryption keys derived from a key schedule.

In some examples, verifying the welcome tag includes: recomputing a welcome transcript to produce a recomputed welcome transcript and generating a derived welcome key from the recomputed welcome transcript; recomputing a message authentication code using the recomputed welcome transcript and the derived welcome key to produce a recomputed message authentication code; and comparing the recomputed message authentication code with the message authentication code of the welcome message.

In some examples, the joiner secret is derived from a key schedule and key derivation operations performed by the second endpoint.

In some examples, the method further includes: generating a confirmation tag based on a message authentication code operation performed over a confirmation key and a hash of the welcome transcript, wherein the confirmation key is derived from an exporter secret; and including the confirmation tag in the confirmation message.

In some examples, the method further includes: deriving, from the exporter secret, new transport keys for secure messages to be sent to the second endpoint in a next epoch.

In some examples, the method further includes the first endpoint or the second endpoint initiating a key update by sending to the other endpoint an update message that contains a fresh commit secret for a next epoch and a new key package that includes a fresh encryption key that is signed with a signature key of the first endpoint or the second endpoint that sent the update message, and encrypted with an encryption key of the other endpoint.

In some examples, the method further includes the other endpoint that receives the update message: generating a confirmation key from an exporter secret over the hash of the welcome transcript; generating a confirmation tag based on a message authentication code operation performed over the confirmation key; and sending a confirmation message containing the confirmation tag, wherein the first endpoint and the second endpoint derive, from the exporter secret and the transcript hash, new transport keys for secure messages to be sent to the other endpoint in a next epoch.

In some examples, the method further includes: the first endpoint or the second endpoint sending an upgrade request message to the other endpoint to convert the one-to-one secure messaging session to a group messaging session; and upon the other endpoint agreeing to upgrade to a group messaging session, receiving from the other endpoint a welcome message that contains at least one pre-shared key derived from keying material generated by the other endpoint during the one-to-one secure messaging session.

In some examples, the upgrade request message further indicates to add that at least a third endpoint to the group messaging session.

In some examples, the first endpoint is a Hypertext Transfer Protocol (HTTP) client and the second endpoint is an HTTP server, further including: the first endpoint sending to the second endpoint a transport initiation message to initiate a transport connection to the second endpoint, the transport initiation message indicating an identity of the HTTP server that the first endpoint seeks to connect to, wherein the welcome message sent by the second endpoint includes a credential that matches the identity indicated in the transport initiation message.

In some examples, the identity of the HTTP server and an indication of application-layer protocols supported by the first endpoint are included the first endpoint key package.

In some examples, the welcome message sent by the second endpoint further includes an indication of which particular application-layer protocol is to be used over the one-to-one secure channel, and thereafter the first endpoint initiates an HTTP request to the second endpoint using the particular application-layer protocol.

In some examples, the second endpoint is a Hypertext Transfer Protocol (HTTP) client and the first endpoint is an HTTP server, wherein the first endpoint pre-publishes an initial message that includes a credential authenticating one or more domains that the first endpoint is to represent as an HTTP server.

In some examples, the initial message further includes an indication of a set of application-layer protocols supported by the first endpoint, and wherein the welcome message sent by the second endpoint includes an indication of a particular application-layer protocol is to be used over the one-to-one secure channel, and thereafter the second endpoint initiates an HTTP request to the first endpoint using the particular application-layer protocol.

In some examples, the method further includes: the first endpoint or the second endpoint initiating a Transmission Control Protocol (TCP) handshake with the other endpoint; upon completion of the TCP handshake and establishing of a TCP connection between the first endpoint and the second endpoint, the first endpoint receiving the welcome message from the second endpoint over the TCP connection, and the first endpoint sending the confirmation message over the TCP connection; and upon completion of the one-to-one secure channel handshake, either of the first endpoint or the second endpoint transmitting messages, with application data encrypted with encryption keys derived from the one-to-one secure channel handshake, over the TCP connection.

In some examples, the welcome message and the confirmation message are carried in respective handshake messages of an encrypted connection-oriented protocol, wherein upon completion of the one-to-one secure channel handshake over the encrypted connection-oriented protocol, keys derived from one-to-one secure channel handshake are used to encrypt packets transmitted via the encrypted connection-oriented protocol.

In some examples, the encrypted connection-oriented protocol is the QUIC protocol of RFC 9000 of the Internet Engineering Task Force (IETF).

In some examples, the welcome message and the confirmation message are fragmented according to a framing protocol.

In some examples, the framing protocol is the User Datagram Protocol (UDP), and the welcome message and the confirmation message are fragmented across a sequence of UDP datagrams.

In some examples, a method is provided to establish a one-to-one secure channel between a first endpoint and a second endpoint by performing a one-to-one secure channel handshake, the method performed by the second endpoint and including: obtaining a first endpoint key package, the first endpoint key package including a first endpoint ephemeral public encryption key and a first endpoint signature verification key corresponding to a first endpoint signature key, wherein the first endpoint key package is signed with the first endpoint signature key; generating a welcome message to be sent to the first endpoint, the welcome message including: welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript includes the first endpoint key package and the welcome content; and a signature computed over the welcome content and welcome tag using a second endpoint signature key; encrypting the welcome message using the first endpoint ephemeral public encryption key to produce an encrypted welcome message and transmitting the encrypted welcome message to the first endpoint; and upon the first endpoint decrypting the welcome message, verifying the signature of the welcome message using the second endpoint signature verification key, and verifying the welcome tag by recomputing a message authentication code using the welcome transcript and the welcome key, receiving from the first endpoint a confirmation message.

In some examples, obtaining includes obtaining the first endpoint key package in a message received from the first endpoint or by downloading the first endpoint key package from a server.

In some examples, the techniques described herein relate to one or more non-transitory computer readable storage media encoded with instructions that, when executed by a processor, cause the processor to perform operations for a method to establish a one-to-one secure channel between a first endpoint and a second endpoint by performing a one-to-one secure channel handshake, the method performed by the first endpoint and including: receiving from the second endpoint, a welcome message including: welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript includes a first endpoint key package and the welcome content; and a signature computed over the welcome content and welcome tag using a second endpoint signature key, verifying the welcome message by: decrypting the welcome message using a first endpoint private decryption key that corresponds to a first endpoint ephemeral public encryption key; verifying the signature of the welcome message using the second endpoint signature verification key; and verifying the welcome tag in the welcome message; and upon verifying the welcome message, sending a confirmation message that confirms the one-to-one secure channel.

In some examples, the techniques described herein relate to one or more non-transitory computer readable storage media, wherein the instructions for verifying the welcome tag includes instructions that cause the processor to perform operations including: recomputing a welcome transcript to produce a recomputed welcome transcript and generating a derived welcome key from the recomputed welcome transcript; recomputing a message authentication code using the recomputed welcome transcript and the derived welcome key to produce a recomputed message authentication code; and comparing the recomputed message authentication code with the message authentication code of the welcome message.

In some examples, the techniques described herein relate to one or more non-transitory computer readable storage media, further including instructions that, when executed by the processor, cause the processor to perform operations including: generating a confirmation tag based on a message authentication code operation performed over a confirmation key and a hash of the welcome transcript, wherein the confirmation key is derived from an exporter secret; and including the confirmation tag in the confirmation message.

In some examples, the techniques described herein relate to one or more non-transitory computer readable storage media encoded with instructions that, when executed by a processor, cause the processor to perform operations for a method to establish a one-to-one secure channel between a first endpoint and a second endpoint by performing a one-to-one secure channel handshake, the method performed by the second endpoint and including: obtaining a first endpoint key package, the first endpoint key package including a first endpoint ephemeral public encryption key and a first endpoint signature verification key corresponding to a first endpoint signature key, wherein the first endpoint key package is signed with the first endpoint signature key; generating a welcome message to be sent to the first endpoint, the welcome message comprising: welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript comprises the first endpoint key package and the welcome content; and a signature computed over the welcome content and welcome tag using a second endpoint signature key; encrypting the welcome message using the first endpoint ephemeral public encryption key to produce an encrypted welcome message and transmitting the encrypted welcome message to the first endpoint; and upon the first endpoint decrypting the welcome message, verifying the signature of the welcome message using the second endpoint signature verification key, and verifying the welcome tag by recomputing a message authentication code using the welcome transcript and the welcome key, receiving from the first endpoint a confirmation message.

In some examples, an apparatus is provided comprising one or more network interfaces that enable communications, a processor, and a memory, where the processor is configured to perform operations on behalf of a first endpoint to establish a one-to-one secure channel with a second endpoint by performing a one-to-one secure channel handshake, the operations including: receiving from the second endpoint, a welcome message comprising: welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript comprises a first endpoint key package and the welcome content; and a signature computed over the welcome content and the welcome tag using a second endpoint signature key; verifying the welcome message by: decrypting the welcome message using a first endpoint private decryption key that corresponds to a first endpoint ephemeral public encryption key; verifying the signature of the welcome message using the second endpoint signature verification key; and verifying the welcome tag in the welcome message; and upon verifying the welcome message, sending to the second endpoint a confirmation message that confirms the one-to-one secure channel.

In some examples, an apparatus is provided comprising one or more network interfaces that enable communications, a processor, and a memory, where the processor is configured to perform operations on behalf of a second endpoint to establish a one-to-one secure channel with a first endpoint by performing a one-to-one secure channel handshake, the operations including: obtaining a first endpoint key package, the first endpoint key package including a first endpoint ephemeral public encryption key and a first endpoint signature verification key corresponding to a first endpoint signature key, wherein the first endpoint key package is signed with the first endpoint signature key; generating a welcome message to be sent to the first endpoint, the welcome message comprising: welcome content including a joiner secret, a session identifier, a second endpoint ephemeral public encryption key and a second endpoint signature verification key; a welcome tag that is a message authentication code computed over a welcome transcript using a welcome key derived from the joiner secret, wherein the welcome transcript comprises the first endpoint key package and the welcome content; and a signature computed over the welcome content and welcome tag using a second endpoint signature key; encrypting the welcome message using the first endpoint ephemeral public encryption key to produce an encrypted welcome message and transmitting the encrypted welcome message to the first endpoint; and upon the first endpoint decrypting the welcome message, verifying the signature of the welcome message using the second endpoint signature verification key, and verifying the welcome tag by recomputing a message authentication code using the welcome transcript and the welcome key, receiving from the first endpoint a confirmation message.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method to establish a one-to-one secure channel between a first endpoint and a second endpoint by performing a one-to-one secure channel handshake, the method performed by the first endpoint and comprising:
   receiving from the second endpoint, a welcome message comprising:
      welcome content including a joiner secret, a session identifier, a second endpoint ephemeral public encryption key and a second endpoint signature verification key;
      a welcome tag that is a message authentication code computed over a welcome transcript using a welcome key derived from the joiner secret, wherein the welcome transcript comprises a first endpoint key package and the welcome content; and
      a signature computed over the welcome content and the welcome tag using a second endpoint signature key;
   verifying the welcome message by:
      decrypting the welcome message using a first endpoint private decryption key that corresponds to a first endpoint ephemeral public encryption key;
      verifying the signature of the welcome message using the second endpoint signature verification key; and verifying the welcome tag in the welcome message; and
   upon verifying the welcome message, sending to the second endpoint a confirmation message that confirms the one-to-one secure channel.

2. The method of claim 1, further comprising engaging in secure messaging between the first endpoint and the second endpoint using transport encryption keys derived from a key schedule.

3. The method of claim 1, wherein verifying the welcome tag comprises:
   recomputing a welcome transcript to produce a recomputed welcome transcript and generating a derived welcome key from the recomputed welcome transcript;
   recomputing a message authentication code using the recomputed welcome transcript and the derived welcome key to produce a recomputed message authentication code; and
   comparing the recomputed message authentication code with the message authentication code of the welcome message.

4. The method of claim 1, wherein the joiner secret is derived from a key schedule and key derivation operations performed by the second endpoint.

5. The method of claim 1, further comprising:
   generating a confirmation tag based on a message authentication code operation performed over a confirmation key and a hash of the welcome transcript, wherein the confirmation key is derived from an exporter secret; and
   including the confirmation tag in the confirmation message.

6. The method of claim 5, further comprising:
   deriving, from the exporter secret, new transport keys for secure messages to be sent to the second endpoint in a next epoch.

7. The method of claim 5, further comprising the first endpoint or the second endpoint initiating a key update by sending to the other endpoint an update message that contains a fresh commit secret for a next epoch and a new key package that includes a fresh encryption key that is signed with a signature key of the first endpoint or the second endpoint that sent the update message, and encrypted with an encryption key of the other endpoint.

8. The method of claim 7, further comprising the other endpoint that receives the update message:
   generating a confirmation key from an exporter secret over the hash of the welcome transcript;
   generating a confirmation tag based on a message authentication code operation performed over the confirmation key; and
   sending a confirmation message containing the confirmation tag,
   wherein the first endpoint and the second endpoint derive, from the exporter secret and the transcript hash, new transport keys for secure messages to be sent to the other endpoint in a next epoch.

9. The method of claim 1, further comprising:
   the first endpoint or the second endpoint sending an upgrade request message to the other endpoint to convert the one-to-one secure messaging session to a group messaging session; and
   upon the other endpoint agreeing to upgrade to a group messaging session, receiving from the other endpoint a welcome message that contains at least one pre-shared key derived from keying material generated by the other endpoint during the one-to-one secure messaging session.

10. The method of claim 9, wherein the upgrade request message further indicates to add that at least a third endpoint to the group messaging session.

11. The method of claim 1, wherein the first endpoint is a Hypertext Transfer Protocol (HTTP) client and the second endpoint is an HTTP server, further comprising:

the first endpoint sending to the second endpoint a transport initiation message to initiate a transport connection to the second endpoint, the transport initiation message indicating an identity of the HTTP server that the first endpoint seeks to connect to, wherein the welcome message sent by the second endpoint includes a credential that matches the identity indicated in the transport initiation message.

12. The method of claim 11, wherein the identity of the HTTP server and an indication of application-layer protocols supported by the first endpoint are included the first endpoint key package.

13. The method of claim 12, wherein the welcome message sent by the second endpoint further includes an indication of which particular application-layer protocol is to be used over the one-to-one secure channel, and thereafter the first endpoint initiates an HTTP request to the second endpoint using the particular application-layer protocol.

14. The method of claim 1, wherein the second endpoint is a Hypertext Transfer Protocol (HTTP) client and the first endpoint is an HTTP server, wherein the first endpoint pre-publishes an initial message that includes a credential authenticating one or more domains that the first endpoint is to represent as an HTTP server.

15. The method of claim 14, wherein the initial message further includes an indication of a set of application-layer protocols supported by the first endpoint, and wherein the welcome message sent by the second endpoint includes an indication of a particular application-layer protocol is to be used over the one-to-one secure channel, and thereafter the second endpoint initiates an HTTP request to the first endpoint using the particular application-layer protocol.

16. The method of claim 1, further comprising:

the first endpoint or the second endpoint initiating a Transmission Control Protocol (TCP) handshake with the other endpoint;

upon completion of the TCP handshake and establishing of a TCP connection between the first endpoint and the second endpoint, the first endpoint receiving the welcome message from the second endpoint over the TCP connection, and the first endpoint sending the confirmation message over the TCP connection; and upon completion of the one-to-one secure channel handshake, either of the first endpoint or the second endpoint transmitting messages, with application data encrypted with encryption keys derived from the one-to-one secure channel handshake, over the TCP connection.

17. The method of claim 1, wherein the welcome message and the confirmation message are carried in respective handshake messages of an encrypted connection-oriented protocol, wherein upon completion of the one-to-one secure channel handshake over the encrypted connection-oriented protocol, keys derived from one-to-one secure channel handshake are used to encrypt packets transmitted via the encrypted connection-oriented protocol.

18. The method of claim 17, wherein the encrypted connection-oriented protocol is the QUIC protocol of RFC 9000 of the Internet Engineering Task Force (IETF).

19. The method of claim 1, wherein the welcome message and the confirmation message are fragmented according to a framing protocol.

20. The method of claim 19, wherein the framing protocol is the User Datagram Protocol (UDP), and the welcome message and the confirmation message are fragmented across a sequence of UDP datagrams.

21. A method to establish a one-to-one secure channel between a first endpoint and a second endpoint by performing a one-to-one secure channel handshake, the method performed by the second endpoint and comprising:

obtaining a first endpoint key package, the first endpoint key package including a first endpoint ephemeral public encryption key and a first endpoint signature verification key corresponding to a first endpoint signature key, wherein the first endpoint key package is signed with the first endpoint signature key;

generating a welcome message to be sent to the first endpoint, the welcome message comprising:

welcome content including a joiner secret, a session identifier, a second endpoint ephemeral public encryption key and a second endpoint signature verification key;

a welcome tag that is a message authentication code computed over a welcome transcript using a welcome key derived from the joiner secret, wherein the welcome transcript comprises the first endpoint key package and the welcome content; and a signature computed over the welcome content and welcome tag using a second endpoint signature key;

encrypting the welcome message using the first endpoint ephemeral public encryption key to produce an encrypted welcome message and transmitting the encrypted welcome message to the first endpoint; and upon the first endpoint decrypting the welcome message, verifying the signature of the welcome message using the second endpoint signature verification key, and verifying the welcome tag by recomputing a message authentication code using the welcome transcript and the welcome key, receiving from the first endpoint a confirmation message.

22. The method of claim 21, wherein obtaining comprises obtaining the first endpoint key package in a message received from the first endpoint or by downloading the first endpoint key package from a server.

23. The method of claim 21, further comprising engaging in secure messaging between the first endpoint and the second endpoint using transport encryption keys derived from a key schedule.

24. One or more non-transitory computer readable storage media encoded with instructions that, when executed by a processor, cause the processor to perform operations for a method to establish a one-to-one secure channel between a first endpoint and a second endpoint by performing a one-to-one secure channel handshake, the method performed by the first endpoint and comprising:

receiving from the second endpoint, a welcome message comprising:

welcome content including a joiner secret, a session identifier, a second endpoint ephemeral public encryption key and a second endpoint signature verification key;

a welcome tag that is a message authentication code computed over a welcome transcript using a welcome key derived from the joiner secret, wherein the welcome transcript comprises a first endpoint key package and the welcome content; and a signature computed over the welcome content and welcome tag using a second endpoint signature key, verifying the welcome message by:

decrypting the welcome message using a first endpoint private decryption key that corresponds to a first endpoint ephemeral public encryption key;

verifying the signature of the welcome message using the second endpoint signature verification key; and verifying the welcome tag in the welcome message; and upon verifying the welcome message, sending a confirmation message that confirms the one-to-one secure channel.

25. The one or more non-transitory computer readable storage media of claim 24, wherein the instructions for verifying the welcome tag comprises instructions that cause the processor to perform operations including:

recomputing a welcome transcript to produce a recomputed welcome transcript and generating a derived welcome key from the recomputed welcome transcript;

recomputing a message authentication code using the recomputed welcome transcript and the derived welcome key to produce a recomputed message authentication code; and comparing the recomputed message authentication code with the message authentication code of the welcome message.

26. The one or more non-transitory computer readable storage media of claim 24, further comprising instructions that, when executed by the processor, cause the processor to perform operations including:

generating a confirmation tag based on a message authentication code operation performed over a confirmation key and a hash of the welcome transcript, wherein the confirmation key is derived from an exporter secret; and including the confirmation tag in the confirmation message.

* * * * *